United States Patent
Narumiya et al.

(10) Patent No.: US 12,306,363 B2
(45) Date of Patent: May 20, 2025

(54) SEISMIC SENSOR, EARTHQUAKE DETECTION METHOD, AND EARTHQUAKE DETECTION PROGRAM

(71) Applicant: OMRON CORPORATION, Kyoto (JP)

(72) Inventors: Akinori Narumiya, Kyoto (JP); Hideyuki Urata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 70 days.

(21) Appl. No.: 18/170,968

(22) Filed: Feb. 17, 2023

(65) Prior Publication Data

US 2023/0314644 A1 Oct. 5, 2023

(30) Foreign Application Priority Data

Mar. 30, 2022 (JP) ................. 2022-054963

(51) Int. Cl.
*G01V 1/16* (2006.01)
*G01V 1/01* (2024.01)
*G01V 1/18* (2006.01)
*G01V 1/30* (2006.01)

(52) U.S. Cl.
CPC ............... *G01V 1/162* (2013.01); *G01V 1/01* (2024.01); *G01V 1/18* (2013.01); *G01V 1/307* (2013.01); *G01V 2210/1232* (2013.01)

(58) Field of Classification Search
CPC . G01V 1/162; G01V 1/01; G01V 1/18; G01V 1/307; G01V 2210/1232; G01V 1/003
See application file for complete search history.

(56) References Cited

U.S. PATENT DOCUMENTS

| | | | |
|---|---|---|---|
| 2018/0188396 A1 | 7/2018 | Sakuma et al. | |
| 2023/0314642 A1* | 10/2023 | Narumiya | G01V 1/01 367/14 |
| 2023/0314644 A1* | 10/2023 | Narumiya | G01V 1/18 367/178 |

FOREIGN PATENT DOCUMENTS

| | | | | |
|---|---|---|---|---|
| CN | 112946727 A | * | 6/2021 | G01V 1/008 |
| CN | 112946727 B | * | 9/2021 | G01V 1/008 |
| CN | 116893443 A | * | 10/2023 | G01V 1/008 |

(Continued)

OTHER PUBLICATIONS

Translation of CN112946727. (Year: 2021).*

*Primary Examiner* — Daniel Pihulic
(74) *Attorney, Agent, or Firm* — METROLEX IP LAW GROUP, PLLC; Robert L Scott, Esq.

(57) ABSTRACT

A seismic sensor 10 comprises an acceleration acquisition unit 21, an acceleration waveform generation unit 22, a frequency sensing unit 24, and an earthquake determination unit 25. The acceleration acquisition unit 21 detects vibration and measures the acceleration of the vibration. The acceleration waveform generation unit 22 generates an acceleration waveform that indicates the relation between the elapsed time and the acceleration measured by the acceleration acquisition unit 21. The frequency sensing unit 24 senses the frequency of the acceleration waveform generated by the acceleration waveform generation unit 22 using a zero-crossing method. The earthquake determination unit 25 determines whether or not there is an earthquake on the basis of the frequency sensed by the frequency sensing unit 24.

16 Claims, 15 Drawing Sheets

(56) References Cited

FOREIGN PATENT DOCUMENTS

| | | | | |
|---|---|---|---|---|
| CN | 116893444 A | * | 10/2023 | ............. G01V 1/008 |
| EP | 4295760 A1 | * | 12/2023 | ........... A61B 5/0507 |
| JP | 2017-015604 A | | 1/2017 | |
| JP | 2023147459 A | * | 10/2023 | ............. G01V 1/008 |
| JP | 2023147463 A | * | 10/2023 | ............. G01V 1/008 |
| WO | WO-2022161141 A1 | * | 8/2022 | ............. G01V 1/008 |

* cited by examiner

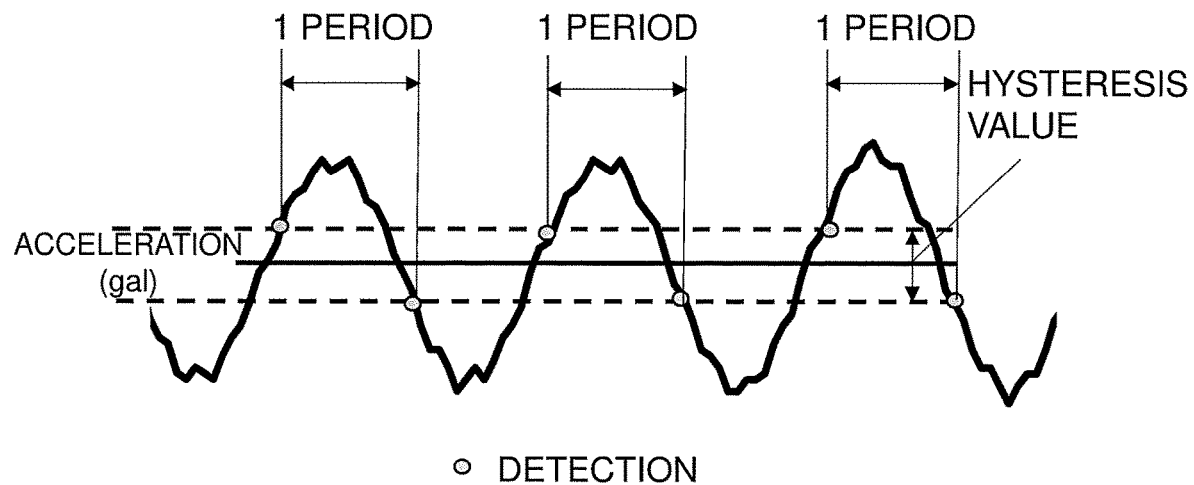
FIG. 3A  ZERO-CROSSING METHOD
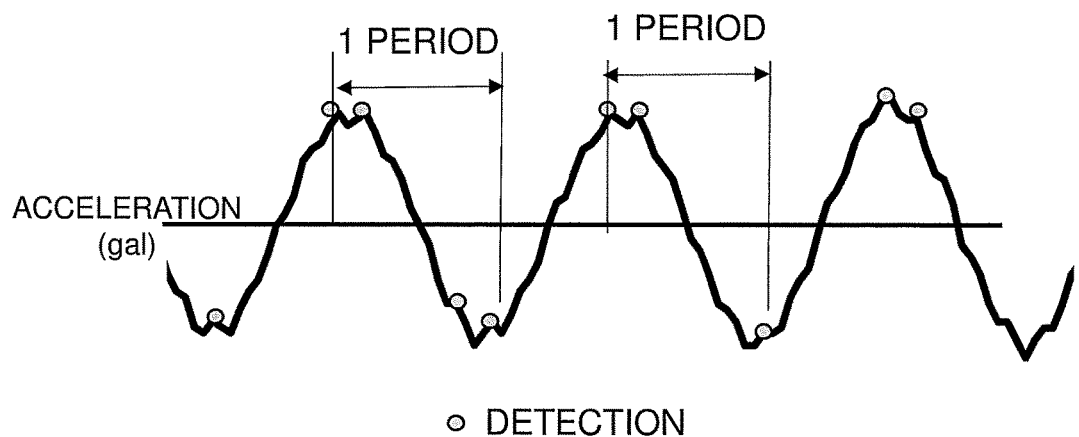
FIG. 3B  PEAK METHOD

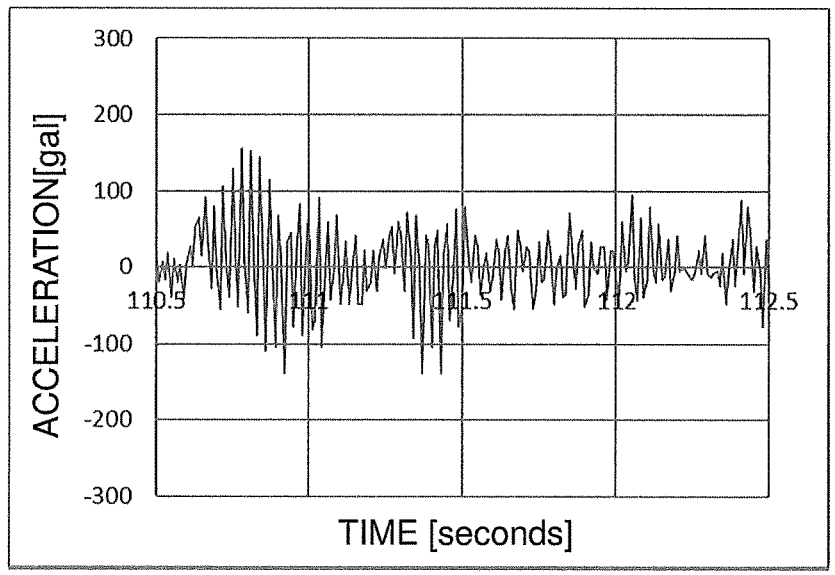
FIG. 8A
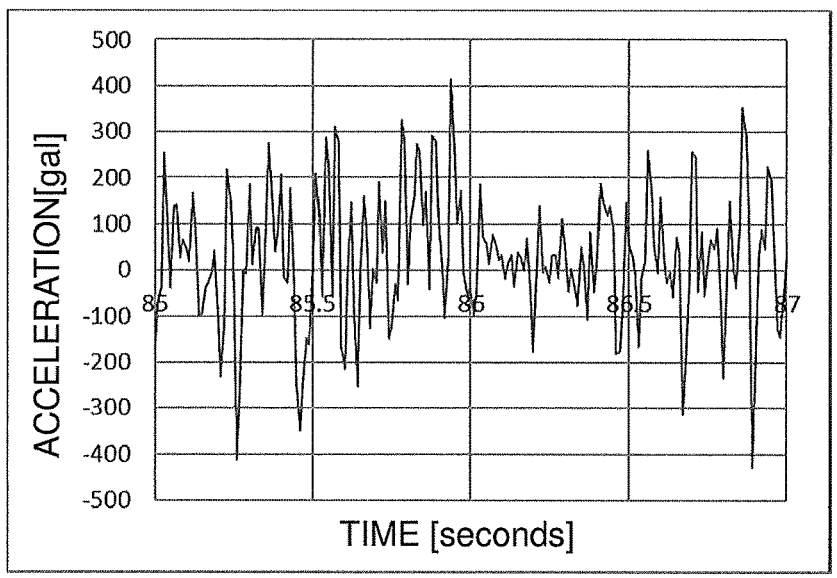
FIG. 8B
| FREQUENCY | PERIOD FLUCTUATION | DISCRIMINATION |
|---|---|---|
| LOW FREQUENCY | LARGE | EARTHQUAKE |
| | SMALL | EARTHQUAKE |
| HIGH FREQUENCY | LARGE | EARTHQUAKE |
| | SMALL | IMPACT (NOT AN EARTHQUAKE) |
FIG. 8C

| AMPLITUDE | FREQUENCY | DISCRIMINATION |
|---|---|---|
| LARGE | HIGH FREQUENCY | IMPACT (NOT AN EARTHQUAKE) |
| | LOW FREQUENCY | EARTHQUAKE |
| SMALL | HIGH FREQUENCY | EARTHQUAKE |
| | LOW FREQUENCY | EARTHQUAKE |

| REGION CONSIDERED TO BE STOPPAGE PERIOD | DISCRIMINATION |
|---|---|
| YES | IMPACT (NOT AN EARTHQUAKE) |
| NO | EARTHQUAKE |

SEISMIC SENSOR, EARTHQUAKE DETECTION METHOD, AND EARTHQUAKE DETECTION PROGRAM

CROSS-REFERENCE TO RELATED APPLICATIONS

This application claims priority to Japanese Patent Application No. 2022-054963 filed on Mar. 30, 2022. The entire disclosure of Japanese Patent Application No. 2022-054963 is hereby incorporated herein by reference.

BACKGROUND

Technical Field

The present invention relates to a seismic sensor for detecting seismic motion, an earthquake detection method, and an earthquake detection program.

Description of the Related Art

Recent years have witnessed the use of seismic sensors that are built into gas meters, electric power meters, distribution boards, electrical outlets, and so forth and that output a cutoff signal for cutting off the supply of gas, electricity, or the like when an earthquake motion of at least a specific magnitude (such as a seismic intensity of over 5) is detected.

For example, Patent Literature 1 discloses a seismic sensor in which earthquake determination is performed after changing from power saving mode to measurement mode, and if it is determined that there is no earthquake, the system returns to power saving mode and filters the measured acceleration to reduce noise, thereby improving the accuracy of determination by removing noise components.

With the seismic sensor disclosed in Patent Literature 1, when an acceleration of at least a specific value is detected, the system changes from power saving mode to measurement mode and earthquake determination is performed, and if it is determined that there has been no earthquake, the system returns to power saving mode, but if it is determined that there has been an earthquake, an evaluation index indicating the scale of the earthquake is calculated, and if the scale of the earthquake at or above a certain level, processing is performed to notify external devices, related equipment, etc.

CITATION LIST

Patent Literature

Patent Literature 1: JP-A 2017-15604

SUMMARY

Problem to be Solved by the Invention

However, the following problem was encountered with the conventional seismic sensor described above.

With the seismic sensor disclosed in the above-mentioned publication, whether the shaking measured by the seismic sensor is an earthquake or just noise was determined on the basis of the vibration immediately after the sensor transitioned from power saving mode to measurement mode. However, pulse-shaped shocks caused by ordinary vibrations produced by man-made vibrations or the like may be mistakenly detected as earthquakes, and when it was determined that an earthquake with at least a specific vibration intensity had occurred, there was the risk that a cutoff signal for cutting off the supply of electricity or other such energy would be erroneously outputted.

It is an object of the present invention to provide a seismic sensor, an earthquake detection method, and an earthquake detection program with which the proper output can be performed in response to a seismic motion having a vibration intensity sensed according to the acceleration produced by vibration.

Means for Solving Problem

The seismic sensor according to a first invention comprises an acceleration measurement unit, an acceleration waveform generation unit, a frequency sensing unit, and an earthquake determination unit. The acceleration measurement unit detects vibration and measures the acceleration of the vibration. The acceleration waveform generation unit generates an acceleration waveform indicating the relation between the elapsed time and the acceleration measured by the acceleration measurement unit. The frequency sensing unit senses the frequency of the acceleration waveform generated by the acceleration waveform generation unit by a zero-crossing method. The earthquake determination unit determines whether or not an earthquake has occurred on the basis of the frequency sensed by the frequency sensing unit.

Here, it is determined whether or not the acceleration waveform indicates an earthquake by using the frequency detected by the zero-crossing method from an acceleration waveform indicating the change over time in the acceleration of the vibration sensed by the acceleration sensor.

Here, the "zero-crossing method" is a method for sensing, in a given waveform, a period (frequency) that is between the point at which zero is exceeded (or a hysteresis set near zero), and the point at which there has subsequently been a drop below zero (a hysteresis value at or below zero) and zero is then exceeded (or a hysteresis set near zero). Compared to a peak method, in which the interval between a waveform peak and the next peak is sensed as one period, with the zero-crossing method it is more difficult to detect micro-vibrations, but an advantage is that the frequency can be sensed very accurately, without being affected by micro-vibration noise.

Consequently, in an acceleration waveform, the effect of noise generated when the acceleration is near zero is eliminated, while also eliminating the effect of noise generated near the peak of the acceleration waveform, which allows the frequency of the acceleration waveform to be sensed more accurately than in the past.

Therefore, by using the frequency sensed at high accuracy to determine whether or not the vibration of the acceleration waveform is an earthquake, vibrations that occur when tools are used at nearby construction sites, etc., can be eliminated, and this allows for better accuracy in earthquake determination.

As a result, the proper output can be performed in response to a seismic motion having a vibration intensity sensed according to the acceleration produced by vibration.

The seismic sensor according to the second invention is the seismic sensor according to the first invention, further comprising an offset adjustment unit that adjusts an offset amount of the acceleration waveform according to the magnitude of noise when the earthquake determination unit determines that the vibration detected by the acceleration measurement unit is noise.

Consequently, the offset amount for eliminating the influence of noise can be adjusted according to the noise component contained in the acceleration waveform, so the sensing of frequency performed by zero-crossing method can be performed very accurately.

The seismic sensor according to the third invention is the seismic sensor according to the second invention, wherein the offset adjustment unit adjusts the offset amount of the acceleration waveform according to the determination result of the earthquake determination unit on the basis of the acceleration waveform.

Consequently, the offset amount of the acceleration waveform can be adjusted so that the optimal offset amount is obtained for each detected vibration, on the basis of the determination result of the earthquake determination unit each time vibration is detected.

The seismic sensor according to the fourth invention is the seismic sensor according to any of the first to third inventions, further comprising an earthquake scale calculation unit that determines whether or not an earthquake has at least a specific seismic intensity when the earthquake determination unit determines that there has been an earthquake.

Consequently, if an earthquake is determined to have a seismic intensity of over 5, for example, it is assumed that there may be a risk of fire, gas leakage, or the like, and user safety can be improved by outputting a cutoff signal to stop the supply of energy, such as electricity or gas.

The seismic sensor according to the fifth invention is the seismic sensor according to any of the first to fourth inventions, further comprising an activation determination unit that calculates the intensity of a vibration from the result of measurement by the acceleration measurement unit, and if the intensity of the vibration is at least a specific magnitude, transitions from a power saving mode to a measurement mode in which more power is consumed than in the power saving mode.

Consequently, because a switch to the measurement mode, in which earthquake determination processing and the like are performed using the acceleration waveform of a detected vibration, is made only when the intensity of the vibration is at least a specific magnitude (such as equivalent to a seismic intensity of 4), power consumption can be reduced while also allowing for highly accurate earthquake determination.

The seismic sensor pertaining to the sixth invention is the seismic sensor pertaining to any of the first to fifth inventions, wherein the earthquake determination unit excludes the acceleration waveform from earthquake determination when the acceleration waveform has attenuated to a vibration with no more than a specific seismic intensity within a specific length of time.

Consequently, since a monotonically attenuating vibration does not have an acceleration waveform that is characteristic of an earthquake, it is determined to be highly likely that the vibration is noise rather than an earthquake, and that acceleration waveform can be excluded from earthquake determination.

The seismic sensor pertaining to the seventh invention is the seismic sensor pertaining to any of the first to sixth inventions, wherein the earthquake determination unit excludes the acceleration waveform from earthquake determination when the frequency of the acceleration waveform is at least a specific value and the period fluctuation of the acceleration waveform is no more than a specific value.

Here, the specific value of the frequency is, for example, a frequency of at least 10 Hz (0 to 0.1 second), and for there to be period fluctuation, it is necessary to satisfy the condition that, for example, the fluctuation of the period in a specific length of time be within ±0.01 second three consecutive times.

Consequently, when the frequency of the acceleration waveform is relatively high and the period fluctuation is small, the waveform is determined to be manmade (noise consisting of continuous vibrations at a constant frequency), rather than an acceleration waveform with large period fluctuation that is characteristic of an earthquake, and that acceleration waveform can be excluded from earthquake determination.

The seismic sensor according to the eighth invention is the seismic sensor according to the seventh invention, wherein the frequency sensing unit senses the frequency of the acceleration waveform by a zero-crossing method.

Consequently, by detecting the frequency of an acceleration waveform with relatively high frequency and little period fluctuation by a zero-crossing method, the influence of noise can be eliminated and the frequency can be sensed at high accuracy.

The seismic sensor according to the ninth invention is the seismic sensor according to any of the first to eighth inventions, wherein the earthquake determination unit excludes the acceleration waveform from earthquake determination when the amplitude of the acceleration waveform is at least a specific value and the frequency is at least a specific value.

Here, the specific amplitude value is, for example, at least 700 gal, and the specific frequency value is, for example, a frequency of at least 10 Hz (0 to 0.1 second).

Consequently, when the amplitude and frequency of the acceleration waveform are relatively high, it can be determined that the vibration was produced by an impact such as a collision (high-frequency impact noise), and the acceleration waveform can be excluded from earthquake determination.

The seismic sensor according to the tenth invention is the seismic sensor according to the ninth invention, wherein the frequency sensing unit senses the frequency of the acceleration waveform by a peak method.

Consequently, for acceleration waveforms with relatively large amplitudes and high frequencies, if the peak method is used to sense the frequency, the frequency can be sensed more accurately than with a zero-crossing method, which tends to have a longer period, even for waveforms close to being a triangular wave.

The seismic sensor pertaining to the eleventh invention is the seismic sensor pertaining to any of the first to tenth inventions, further comprising a vibration stoppage period determination unit that determines whether or not there is a period in the acceleration waveform in which vibration has stopped.

Whether or not the vibration has stopped may be determined on the basis of whether or not the amplitude has dropped to zero, or may be determined according to whether or not the amplitude is at or below a specific level, for example.

Consequently, a vibration including a temporary vibration stoppage period, which is unlikely to be an earthquake, is determined not to be an earthquake, and that acceleration waveform can be excluded from earthquake determination.

The seismic sensor according to the twelfth invention is the seismic sensor according to the eleventh invention, wherein the frequency sensing unit senses the frequency of the acceleration waveform by a peak method.

Consequently, regardless of frequency or amplitude, for acceleration waveforms that include a temporary vibration stoppage period, using a peak method to sense the frequency allows the frequency to be sensed more accurately than with a zero-crossing method, which tends to have a longer period, even if the waveform is close to being a triangular wave.

The seismic sensor according to the thirteenth invention is the seismic sensor according to the fourth invention, wherein when an acceleration waveform that can be considered as a shock is detected after the start of calculation of an index indicating the magnitude of the earthquake and after the start of calculation of the earthquake scale, the earthquake scale calculation unit calculates the scale of the earthquake while excluding that acceleration waveform.

Consequently, after the earthquake scale calculation unit has started calculating an index indicating the scale of an earthquake (such as the SI (spectrum intensity) value), if a vibration is detected that is determined to have been caused by shock, rather than a vibration produced by an earthquake, the acceleration waveform can be excluded from the calculation of the index indicating the scale of the earthquake.

This makes it possible to prevent the scale of an earthquake from being calculated larger than it actually is due to the influence of vibration detected after the start of calculation of the index indicating the scale of the earthquake.

The seismic sensor according to the fourteenth invention is the seismic sensor according to the thirteenth invention, wherein the frequency sensing unit senses the frequency of the acceleration waveform by a peak method.

Consequently, for example, for an acceleration waveform that can be considered as a shock having a high frequency and a large amplitude, etc., the frequency can be sensed by using a peak method, which ensures sufficient intervals between peaks.

The seismic sensor according to the fifteenth invention is the seismic sensor according to the thirteenth or fourteenth invention, further comprising an output unit that outputs a specific signal when the earthquake determination unit determines that there is an earthquake.

Consequently, for example, when an earthquake occurs, a cutoff signal for stopping the supply of energy such as electricity or gas, a warning signal for notifying of danger, or the like can be outputted from the output unit.

The seismic sensor according to the sixteenth invention is the seismic sensor according to the fifteenth invention, further comprising an output control unit that controls the output of the signal from the output unit according to whether or not the scale of the earthquake calculated by the earthquake scale calculation unit has at least a specific seismic intensity.

Consequently, when the earthquake scale calculation unit calculates that the scale of an earthquake has a seismic intensity of over 5 (a specific seismic intensity), for example, the output unit can be made to output a cutoff signal that stops the supply of energy such as electricity and gas, a warning signal that warns the user, or the like.

The seismic sensor according to the seventeenth invention is the seismic sensor according to the fifteenth or sixteenth invention, wherein the specific signal is a cutoff signal that stops the supply of energy.

Consequently, for example, when an earthquake of at least a specific seismic intensity is detected, the supply of energy such as electricity and gas can be stopped.

The seismic sensor according to the eighteenth invention is the seismic sensor according to the fifteenth or sixteenth invention, wherein the specific signal is a warning signal that warns the user.

Consequently, for example, when an earthquake of at least a specific seismic intensity is detected, a warning signal can be issued to notify the user of danger.

The earthquake detection method according to the nineteenth invention comprises an acceleration measurement step, an acceleration waveform generation step, a frequency detection step, and an earthquake determination step. The acceleration measurement step involves detecting vibration and measuring the acceleration of the vibration. The acceleration waveform generation step involves generating an acceleration waveform indicating the relation between the elapsed time and the acceleration measured in the acceleration measurement step. The frequency sensing step involves sensing the frequency of the acceleration waveform generated in the acceleration waveform generation step by a zero-crossing method. The earthquake determination step involves determining whether or not there is an earthquake on the basis of the frequency sensed in the frequency sensing step.

Here, it is determined whether or not the acceleration waveform indicates an earthquake by using the frequency sensed by zero-crossing method from the acceleration waveform indicating a change over time in the acceleration of the vibration sensed by the acceleration sensor.

Here, the "zero-crossing method" is a method for sensing, in a given waveform, a period (frequency) that is between the point at which zero is exceeded (or a hysteresis set near zero), and the point at which zero is then exceeded (or a hysteresis set near zero). Compared to a peak method, in which the interval between a waveform peak and the next peak is sensed as one period, with the zero-crossing method it is more difficult to detect micro-vibrations, but an advantage is that the frequency can be sensed very accurately, without being affected by micro-vibration noise.

Consequently, the frequency of the acceleration waveform can be sensed more accurately than in the past by eliminating the effects of noise generated near the acceleration waveform peak while also eliminating the effects of noise generated near zero acceleration.

Therefore, by using this accurately sensed frequency to determine whether or not the vibration of the acceleration waveform is an earthquake, vibrations that occur when tools are used at a nearby construction site, for example, can be eliminated, which allows the accuracy of earthquake determination to be improved.

As a result, the proper output can be performed in response to a seismic motion having a vibration intensity sensed according to the acceleration produced by vibration.

The earthquake detection program according to the twentieth invention causes a computer to execute an earthquake detection method comprising an acceleration measurement step, an acceleration waveform generation step, a frequency sensing step, and an earthquake determination step. The acceleration measurement step involves detecting vibration and measuring the acceleration of the vibration. The acceleration waveform generation step involves generating an acceleration waveform indicating the relation between the elapsed time and the acceleration measured in the acceleration measurement step. The frequency sensing step involves sensing the frequency of the acceleration waveform generated in the acceleration waveform generation step by a zero-crossing method. The earthquake determination step involves determining whether or not there is an earthquake on the basis of the frequency sensed in the frequency sensing step.

Here, it is determined whether or not the acceleration waveform indicates an earthquake by using the frequency sensed by the zero-crossing method from the acceleration waveform indicating the change over time in the acceleration of the vibration sensed by the acceleration sensor.

Here, the zero-crossing method is a method for sensing, in a given waveform, a period (frequency) that is between the point at which zero is exceeded (or a hysteresis set near zero), and the point at which zero is then exceeded (or a hysteresis set near zero). Compared to a peak method, in which the interval between a waveform peak and the next peak is sensed as one period, with the zero-crossing method it is more difficult to detect micro-vibrations, but an advantage is that the frequency can be sensed very accurately, without being affected by micro-vibration noise.

Consequently, the frequency of the acceleration waveform can be sensed more accurately than in the past by eliminating the effects of noise generated near the acceleration waveform peak while also eliminating the effects of noise generated near zero acceleration.

Therefore, by using this accurately sensed frequency to determine whether or not the vibration of the acceleration waveform is an earthquake, vibrations that occur when tools are used at a nearby construction site, for example, can be eliminated, which allows the accuracy of earthquake determination to be improved.

As a result, the proper output can be performed in response to a seismic motion having a vibration intensity sensed according to the acceleration produced by vibration.

(Effects)

With the seismic sensor of the present invention, seismic motion having a vibration intensity sensed according to the acceleration produced by the vibration can be properly outputted.

BRIEF DESCRIPTION OF THE DRAWINGS

FIG. 3A is a graph of the zero-crossing method used to sense the frequency of an acceleration waveform of detected vibration, and FIG. 3B is a graph of the peak method used to sense the frequency of the acceleration waveform of the detected vibration;

FIG. 8A is a graph of the acceleration waveform of vibration with small periodic fluctuations classified in the earthquake detection method using the seismic sensor of FIG. 1, FIG. 8B is a graph of the acceleration waveform of vibration with large periodic fluctuations classified in the earthquake detection method using the seismic sensor of FIG. 1, and FIG. 8C is a table showing the results of classifying whether or not vibration is an earthquake according to the frequency and the magnitude of period fluctuation.

DETAILED DESCRIPTION OF THE EMBODIMENT

The seismic sensor according to an embodiment of the present invention will now be described with reference to FIGS. 1 to 15.

In this embodiment, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

(1) Configuration of Seismic Sensor 10

Figure 1:
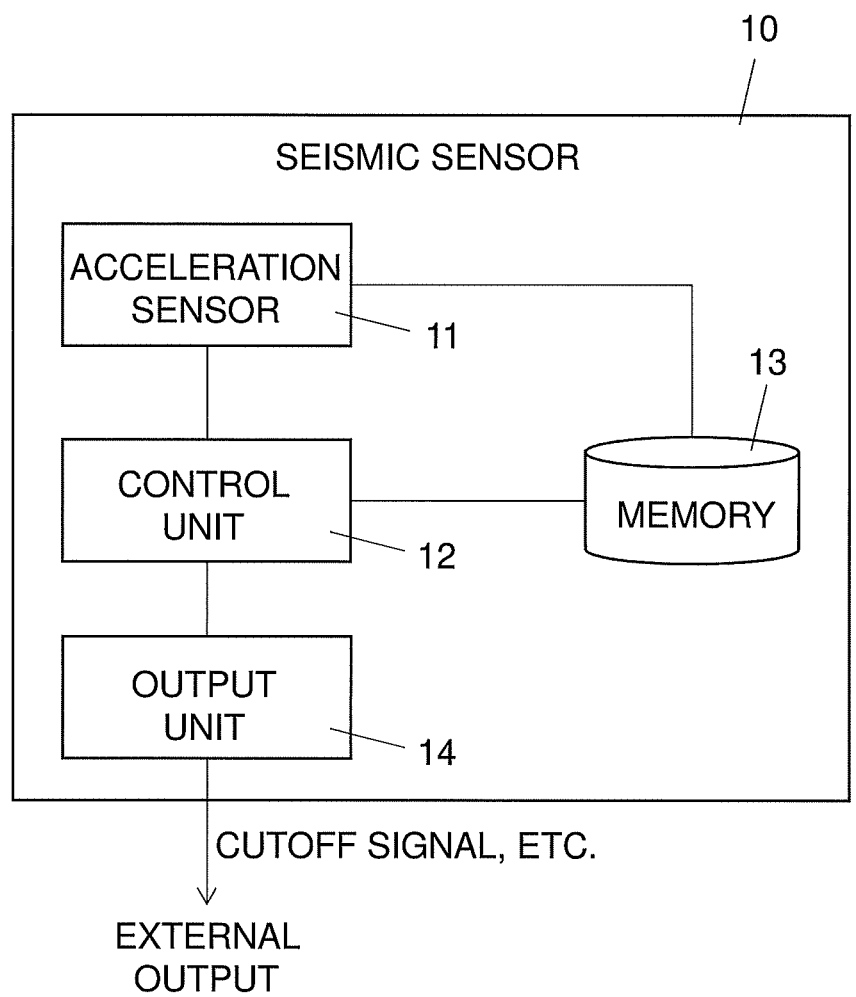
FIG. 1 is a control block diagram of the configuration of a seismic sensor according to an embodiment of the present invention.

The seismic sensor 10 according to this embodiment comprises an acceleration sensor 11, a control unit 12, and a memory 13, as shown in FIG. 1.

The acceleration sensor 11 is, for example, an acceleration sensor featuring a piezoelectric element, or an acceleration sensor that senses electrostatic capacitance between electrodes. Acceleration measured (also referred to as "sampling") by the acceleration sensor 11 is outputted to the control unit 12.

The control unit 12 is, for example, a general-purpose integrated circuit that acquires the acceleration measured by the acceleration sensor 11 in a specific period, detects the occurrence of an earthquake on the basis of the acquired acceleration, and calculates an index value indicating the scale of the earthquake.

Also, the control unit 12 operates in different modes, called active mode and sleep mode, depending on the situation.

In sleep mode, the control unit 12 allows the operation of only limited functions, such as halting the execution of instructions while accepting interrupts, or halting the supply of clock signals. In this sleep mode, power consumption can be reduced more than in active mode.

In the active mode, whether the detected vibration is an earthquake or noise is determined, or an index value indicating the magnitude of the earthquake is calculated.

The functional blocks (see FIG. 2) generated by the CPU in the seismic sensor 10 by reading the earthquake detection program stored in the memory 13 will be described below in detail.

The memory 13 is a temporary storage means such as RAM (random access memory), or a non-volatile memory such as EPROM (erasable programmable read only memory), and stores thresholds used for earthquake determination, the acceleration measured by the acceleration sensor 11, etc.

The memory 13 may be a memory that is built into the acceleration sensor 11 or the control unit 12.

The output unit 14 is, for example, an output terminal of the control unit 12. When the control unit 12 determines that an earthquake has occurred, for example, information indicating the occurrence and magnitude of the earthquake is outputted to other devices via the output unit 14. Also, when an earthquake of at least a specific magnitude is detected, the output unit 14 outputs to an external device a cutoff signal for stopping the supply of energy such as electricity or gas.

(2) Functional Blocks of Seismic Sensor 10

Figure 2:
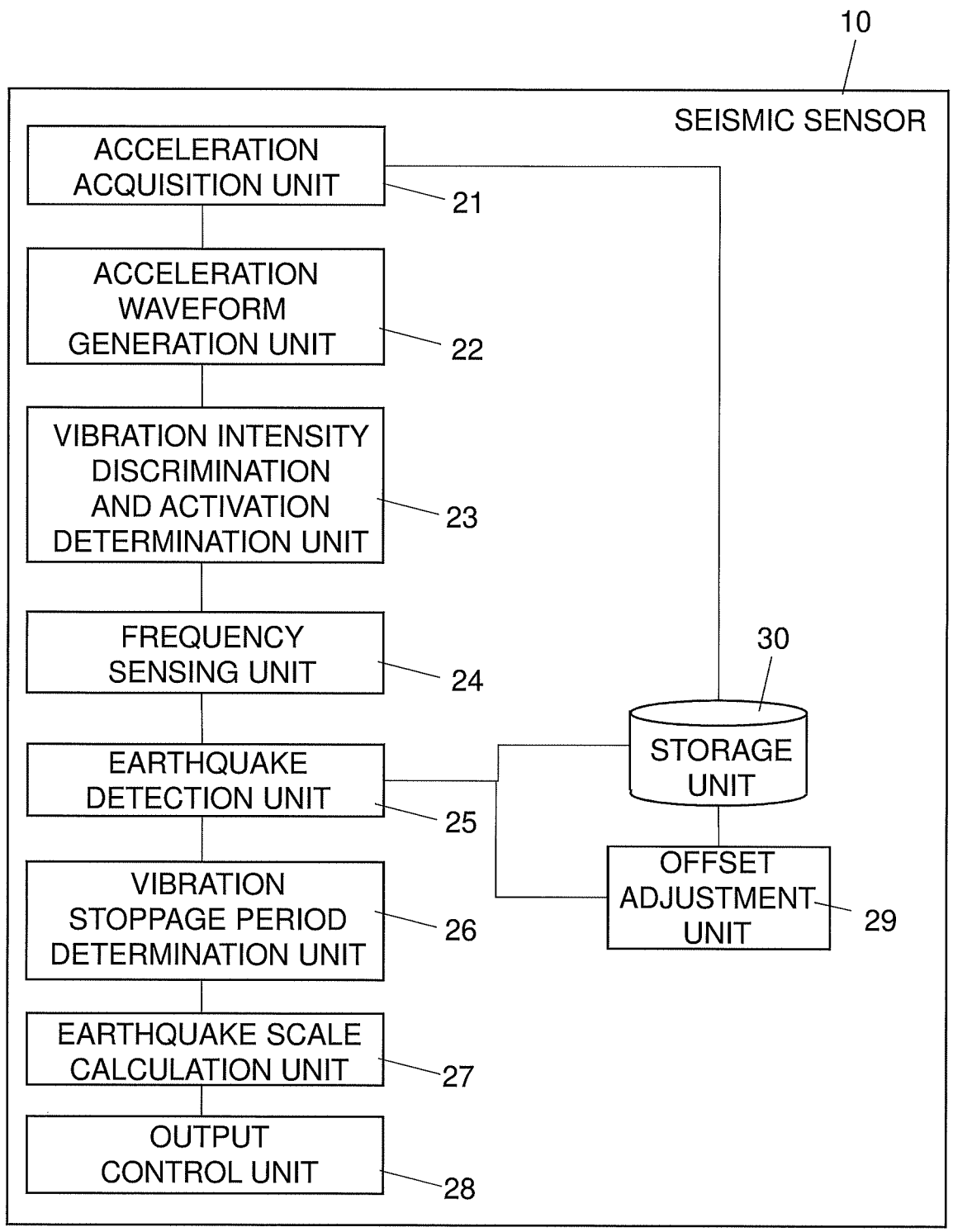
FIG. 2 is a functional block diagram generated within the seismic sensor of FIG. 1.

As shown in FIG. 2, the seismic sensor 10 comprises an acceleration acquisition unit (acceleration measurement unit) 21, an acceleration waveform generation unit 22, a vibration intensity discrimination and activation determination unit 23, a frequency sensing unit 24, an earthquake determination unit 25, a vibration stoppage period determination unit 26, an earthquake scale calculation unit 27, an output control unit 28, an offset adjustment unit 29, and a storage unit 30.

The acceleration acquisition unit 21 acquires measurement data about acceleration measured by the acceleration sensor 11 at specific intervals. The acceleration acquisition unit 21 normally acquires measurement data for acceleration repeatedly measured at a relatively low speed (that is, a relatively long measurement period).

When acceleration sampling is performed at such a low speed, the control unit 12 basically operates in sleep mode (standby state or power saving mode) in which power consumption is lower. Since the standby state is an operation state in which the acceleration sensor 11 performs sampling at low speed, the control unit 12 operates in a sleep mode in which functions are limited, and this lowers power consumption.

Also, when the acceleration acquisition unit 21 acquires a vibration larger than a threshold preset in the storage unit 30, the acceleration sensor 11 repeats measurement of the acceleration at a higher speed (that is, a relatively shorter period) than during low-speed sampling. In this high-speed sampling, the control unit 12 operates in sleep mode or active mode.

The control unit 12 operates in active mode (measurement mode) when the earthquake determination unit 25 or the like executes processing (discussed below). Also, the switch from power saving mode to measurement mode is called activation of the seismic sensor 10.

Since the measurement mode is an operating state in which high-speed sampling is performed, the control unit 12 may operate in sleep mode with limited functionality, or in active mode in which operation is possible at maximum computing power. In measurement mode, the power consumption is higher than in power saving mode because the sampling period is shorter and the control unit 12 is switched from sleep mode to active mode.

The acceleration waveform generation unit 22 generates an acceleration waveform indicating the relation between the elapsed time and the acceleration measured by the acceleration acquisition unit 21 (see FIGS. 4A to 6A, etc.).

The vibration intensity discrimination and activation determination unit 23 is a function on the acceleration sensor 11 side, compares the acceleration value acquired by the acceleration acquisition unit 21 with an activation threshold value held in the storage unit 30, and switches from power saving mode to measurement mode (activation of the seismic sensor 10) in the event that the acceleration value exceeds the activation threshold.

Also, the vibration intensity discrimination and activation determination unit 23 calculates the vibration intensity from the measurement result of the acceleration acquisition unit 21, and switches from power saving mode to measurement mode (activation of the control unit 12), in which more power is consumed than in power saving mode, in the event that the vibration intensity is at least a specific magnitude.

Here, the vibration intensity discrimination processing performed by the vibration intensity discrimination and activation determination unit 23 is carried out by filtering the acceleration value acquired by the acceleration acquisition unit 21. At this point, the filtered acceleration is stored in the storage unit 30.

With the seismic sensor 10 of this embodiment, the vibration intensity discrimination and activation determination unit 23 that performs filtering functions as a so-called digital filter, and an existing technique can be employed for this filtering. The vibration intensity discrimination and activation determination unit 23 functions as a low-pass filter by calculating a moving average of absolute values for acceleration, for example.

The frequency sensing unit 24 senses the frequency of the acceleration waveform generated by the acceleration waveform generation unit 22 using a zero-crossing method.

Here, the "zero-crossing method" is a method for sensing, in a given waveform, a period (frequency) that is between the point at which zero is exceeded (or a hysteresis set near zero), and the point at which zero is then exceeded (or a hysteresis set near zero) (see FIG. 3A). Compared to a peak method (see FIG. 3B), in which the interval between a waveform peak and the next peak is sensed as one period, with the zero-crossing method it is more difficult to detect micro-vibrations, but an advantage is that the influence of noise is eliminated near zero acceleration (within the range of hysteresis), and the frequency can be sensed very accurately, without being affected by micro-vibration noise around the peak value.

The width of the hysteresis value (offset value) that is preset when performing detection by the zero-crossing method shown in FIG. 3A is suitably adjusted according to the type, size, and so forth of the detected vibration.

The earthquake determination unit 25 discriminates whether or not the acceleration waveform whose frequency has been sensed is to be subject to earthquake determination, while determining whether or not the vibration of the acceleration waveform is an earthquake, on the basis of the frequency sensed by the frequency sensing unit 24.

More specifically, if the acceleration waveform has attenuated to a vibration equivalent to a specific seismic intensity or less within a specific length of time (such as when the maximum value—the minimum value of vibration acceleration<100 gal), the earthquake determination unit 25 excludes the acceleration waveform from earthquake determination.

Also, if the frequency of the acceleration waveform sensed by the zero-crossing method is at least a specific value and the period (frequency) fluctuation is no more than a specific value, the earthquake determination unit 25 excludes the acceleration waveform from earthquake determination.

Furthermore, if the amplitude of the acceleration waveform sensed by the peak method is at least a specific value and the frequency is at least a specific value, the earthquake determination unit 25 excludes the acceleration waveform from earthquake determination.

In this embodiment, the earthquake determination unit 25 defines one or more determination periods after acceleration exceeding an activation threshold has been detected, and performs processing for each determination period.

The vibration stoppage period determination unit 26 determines whether or not there is a period in the acceleration waveform during which vibration has stopped after the earthquake determination unit 25 has determined that there is an earthquake.

The determination of whether or not there is a period in the acceleration waveform during which vibration has stopped may be made, for example, based on the presence or absence of a period during which the acceleration drops to zero, or whether or not the acceleration is within a specific threshold range.

When the earthquake determination unit 25 determines that there is an earthquake, the earthquake scale calculation unit 27 determines whether or not the earthquake has at least a specific seismic intensity.

Also, if the detected vibration is determined to be an earthquake, and if an acceleration waveform that can be regarded as a shock is detected after the start of calculation of the index indicating the scale of the earthquake, the earthquake scale calculation unit 27 excludes that acceleration waveform in its calculation of the scale of the earthquake.

At this point, the frequency sensing unit 24 senses the frequency that is used to determine whether or not the detected acceleration waveform can be considered to be an impact, by the peak method.

The output control unit 28 controls the output of a signal from the output unit 14, which outputs a specific signal, depending on whether or not the scale of the earthquake calculated by the earthquake scale calculation unit 27 has at least a specific seismic intensity.

Here, the specific signal outputted from the output unit 14 includes, for example, a cutoff signal that is transmitted to an external device such as an electricity supply device or a gas supply device, in order to stop the supply of energy such as electricity or gas.

If the earthquake determination unit 25 determines that the vibration detected by the acceleration acquisition unit 21 is noise, the offset adjustment unit 29 adjusts the offset amount of the acceleration waveform according to the magnitude of the noise. Then, the offset adjustment unit 29 adjusts the offset amount of the acceleration waveform according to the determination result of the earthquake determination unit 25, which was performed on the basis of the acceleration waveform.

As to the offset adjustment performed by the offset adjustment unit 29, the noise component included in the measured acceleration, such as the amount of change in the measured value that occur along with changes over time in the seismic sensor 10, or the amount of change in the measured value that are caused by a change in the direction of the gravitational acceleration with respect to the when the orientation of the installed seismic sensor 10 is tilted for some reason, is sensed as the offset component. More specifically, the offset adjustment unit 29 calculates the median value of the maximum value and minimum value of acceleration determined to be noise, or the average value of acceleration, as the offset component, for example.

More specifically, when the condition that the maximum value−minimum value of acceleration in one second<100 gal is satisfied, the offset adjustment unit 29 adjusts the hysteresis from the average value of (maximum value−minimum value) (for example, if the average value is 30 gal or greater, the hysteresis is increased to 10% of the average value of (maximum−minimum)).

The calculated offset component is stored in the storage unit 30 and used for activation determination executed by the vibration intensity discrimination and activation determination unit 23, and for earthquake determination executed by the earthquake determination unit 25. Also, the offset amount adjusted by the offset adjustment unit 29 is feedback-controlled every time vibration is detected and an acceleration waveform is generated, and is adjusted to an appropriate value according to the amount of noise.

Consequently, since the offset amount is always set within an appropriate range, the frequency can be detected very accurately even when sensing the frequency of the acceleration waveform using the zero-crossing method, which is more likely to be influenced in the event of improper offset amount deviation.

The storage unit 30 stores, for example, the acceleration data acquired by the acceleration acquisition unit 21, the filtered acceleration data, the determination result by the earthquake determination unit 25, the offset component data used in the offset adjustment unit 29, and so forth.

Comparison of Earthquake-induced Vibration and Other Vibrations

Here, the determination of whether or not vibration is due to an earthquake, which is performed by the seismic sensor 10 of this embodiment, is performed by comparing the characteristics of vibration due to an earthquake with the characteristics of vibrations other than from an earthquake, and excluding any acceleration waveform indicating vibration other than from an earthquake from determination.

Figure 4A:
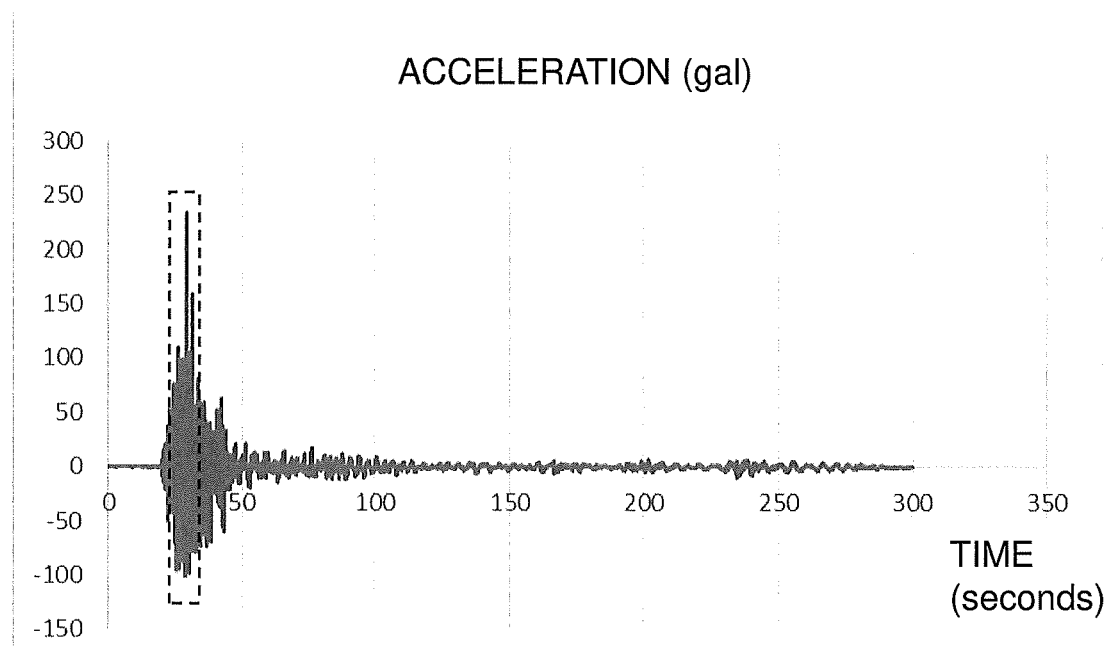
FIG. 4A is a graph of the acceleration waveform of vibration produced by a detected earthquake.
Figure 4B:
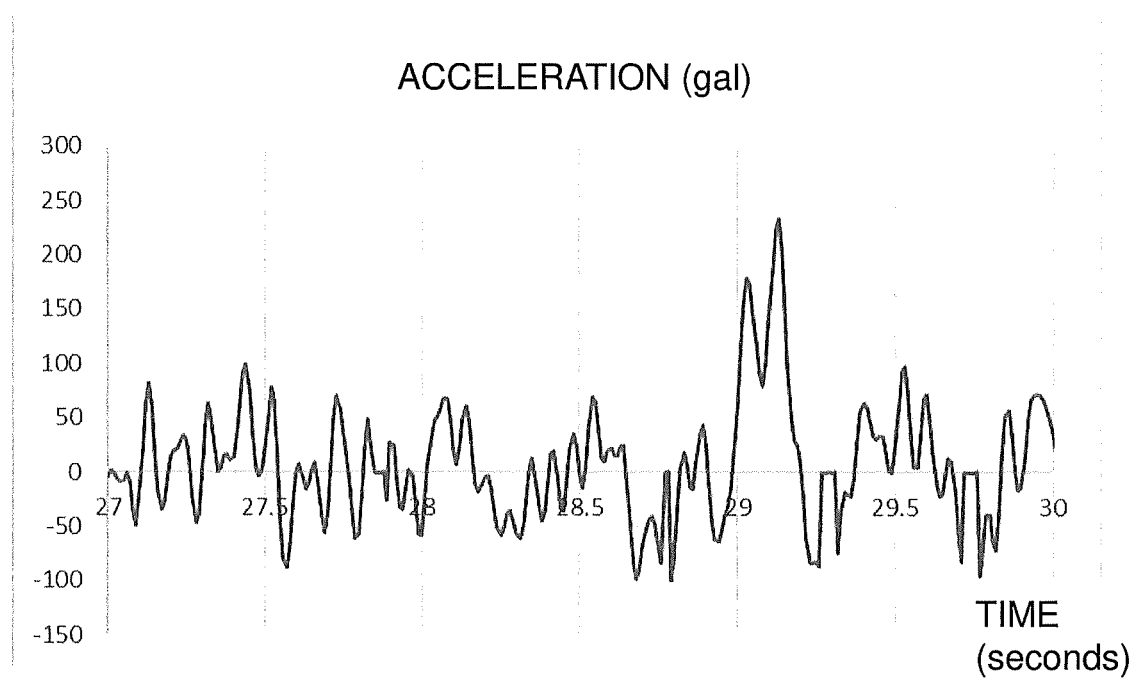
FIG. 4B is a graph in which the range of the dotted line portion in FIG. 4A is enlarged.

That is, as shown in FIGS. 4A and 4B, an acceleration waveform indicating vibration caused by an earthquake has a relatively low frequency (such as 10 Hz or less) and is a complex waveform including vibrations of multiple frequencies, and has the characteristic of exhibiting a relatively gentle rise and fall.

Figure 5A:
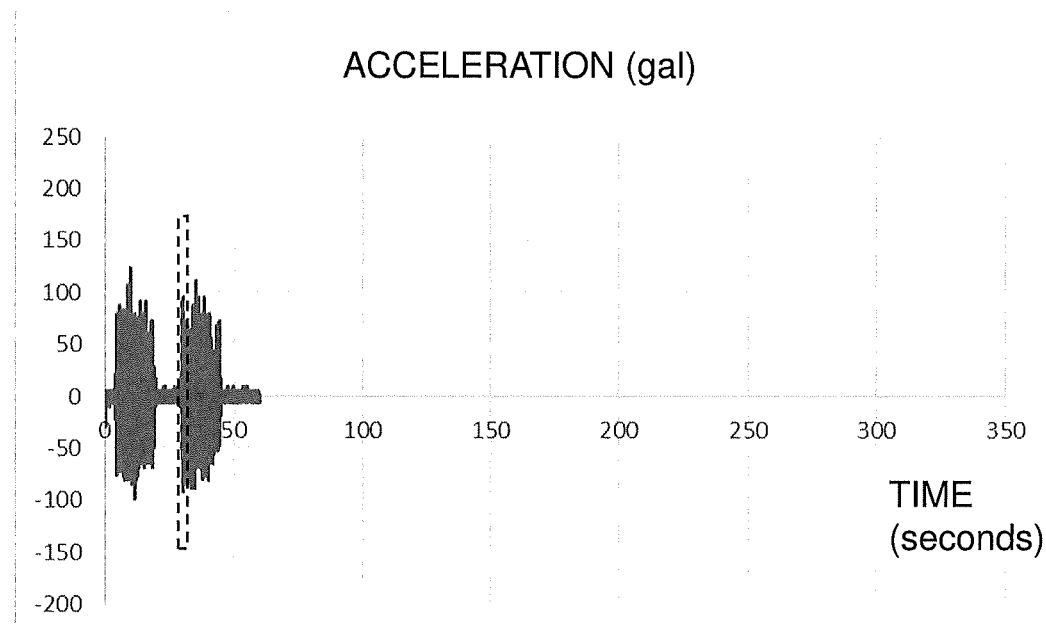
FIG. 5A is a graph of the acceleration waveform of detected vibration other than an earthquake.
Figure 5B:
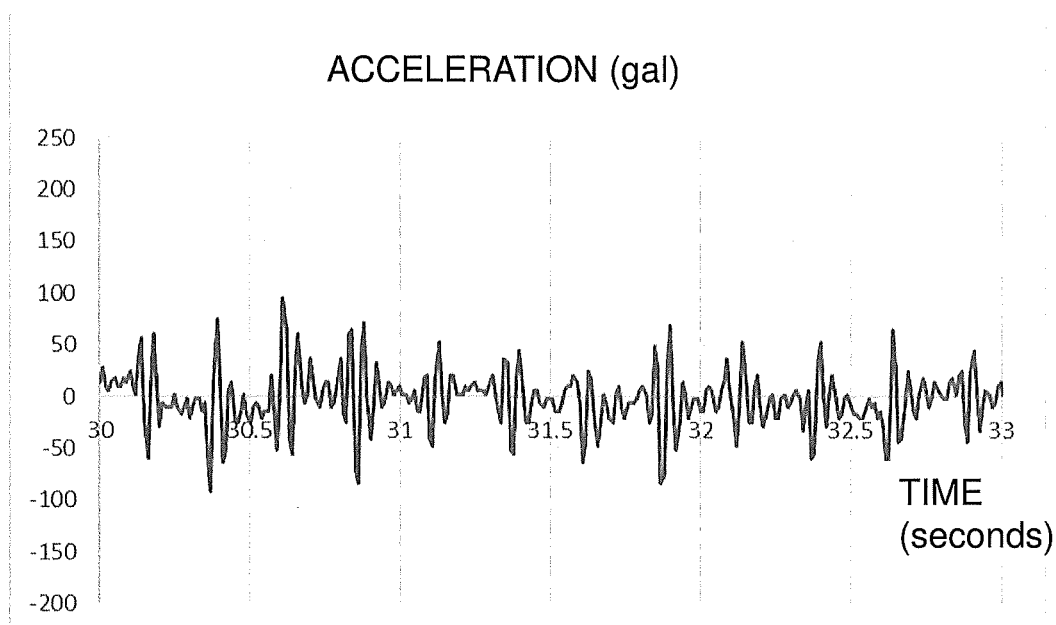
FIG. 5B is a graph in which the range of the dotted line portion in FIG. 5A is enlarged.

On the other hand, with vibrations caused by something other than an earthquake, as shown in FIGS. 5A and 5B, the acceleration waveform has a relatively high frequency and has the characteristic that vibrations of a constant frequency are generated continuously (intermittently). That is, the vibration caused by something other than an earthquake shown in FIGS. 5A and 5B have substantially the same frequency as the vibration of an earthquake, but with less period fluctuation.

Figure 6A:
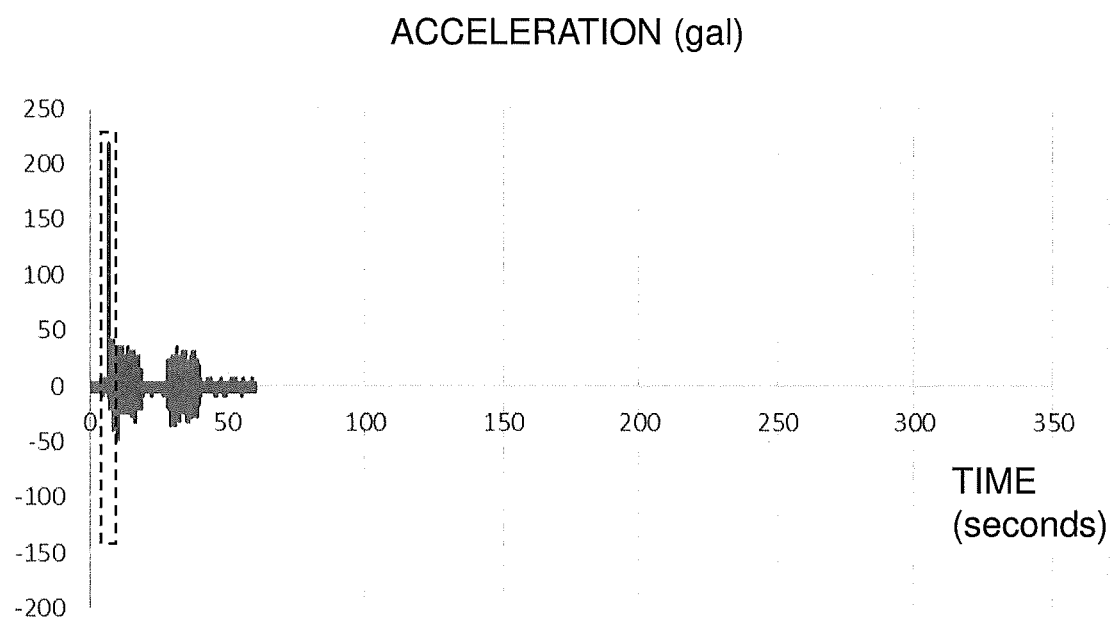
FIG. 6A is a graph of the acceleration waveform of vibration produced by an impact other than a detected earthquake.
Figure 6B:
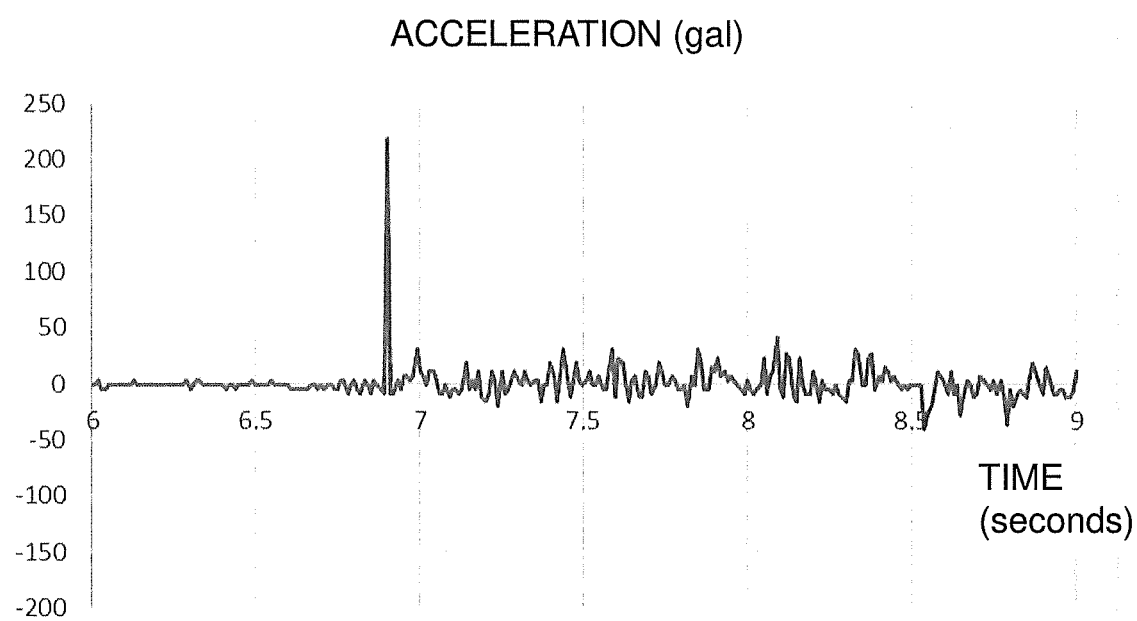
FIG. 6B is a graph in which the range of the dotted line portion in FIG. 6A is enlarged.

The second thing to be compared is that with vibration caused by a shock other than an earthquake exhibits the characteristic that the rise is very sharp and the vibration disappears in a short time, as shown in FIGS. 6A and 6B. That is, the non-earthquake vibration shown in FIGS. 5A and 5B has substantially the same frequency as the earthquake vibration, but with less period fluctuation.

Also, as shown in FIG. 4A, with vibration caused by an earthquake, the vibration occurs constantly in the process of attenuating after being generated, whereas with vibration caused by something other than an earthquake, as shown in FIGS. 5A and 6A, there is a period in which the vibration almost comes to a stop for a specific length of time after being generated (in which the amplitude is no more than a specific value).

Discrimination Processing of Acceleration Waveform

With the seismic sensor 10 of this embodiment, based on the respective characteristics of vibration caused by an earthquake and vibration caused by something other than an earthquake described above, whether or not there is an earthquake is determined according to the frequency, amplitude, and duration of the acceleration waveform indicating the vibration and the presence or absence of a vibration stoppage period, while excluding any acceleration waveforms indicating vibration caused by something other than an earthquake.

That is, the seismic sensor 10 first performs discrimination processing based on vibration intensity.

More specifically, the vibration intensity discrimination and activation determination unit 23 of the seismic sensor 10 excludes any vibrations whose acceleration is less than a specific value (for example, equivalent to a seismic intensity of 4) or that converge within an extremely short period of time, from the acceleration waveform that is used in earthquake determination.

The earthquake determination unit 25 of the seismic sensor 10 then uses the frequencies of the acceleration waveform generated by the acceleration waveform generation unit 22 and the acceleration waveform sensed by the frequency sensing unit 24, and any acceleration waveforms determined to be caused by a vibration other than an earthquake are excluded from earthquake determination.

Figure 7:
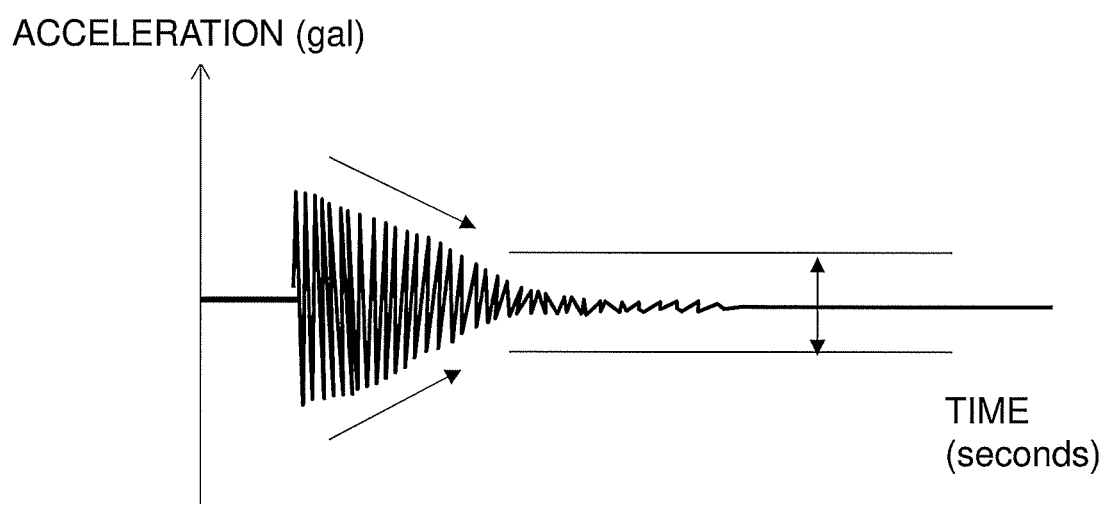
FIG. 7 is a graph of an acceleration waveform that attenuates monotonically, in a detected vibration other than an earthquake.

That is, as shown in FIG. 7, if the acceleration waveform is monotonically attenuating, that is, the acceleration waveform is such that the amplitude of the vibration is monotonically decreasing, the earthquake determination unit 25 determines that the vibration was not caused by an earthquake, and excludes it from earthquake determination.

The determination of whether or not a waveform attenuates monotonically is performed, for example, once every second, as mentioned above, depending on whether or not the condition (maximum value of vibration acceleration−minimum value)<100 gal is satisfied.

Consequently, the remaining waveforms to be subjected to earthquake determination are continuous waveforms (continuous vibration waveforms) and pulse waves, and these are further discriminated by the following processing.

Next, for the acceleration waveforms shown in FIGS. 8A and 8B, the earthquake determination unit 25 uses the frequencies of the acceleration waveforms sensed by the frequency sensing unit 24 by the above-mentioned zero-crossing method to determine whether or not to exclude those acceleration waveforms from earthquake determination.

More specifically, the earthquake determination unit 25 determines that the acceleration waveform shown in FIG. 8A is a manmade vibration waveform because it has a relatively high frequency (such as 0 to 0.1 second (at least 10 Hz)) and is a substantially constant waveform with little period fluctuation (for example, the period fluctuation within a specific length of time is within ±0.01 second three consecutive times), and excludes this waveform from earthquake determination.

On the other hand, the acceleration waveform shown in FIG. 8B has a relatively high frequency and a relatively large period fluctuation, but because it is a high-frequency vibration, the earthquake determination unit 25 excludes it from earthquake determination.

Here, with the seismic sensor 10 of this embodiment, as discussed above, the frequency of the acceleration waveform is sensed by a zero-crossing method. Therefore, determination based on the frequency level and the period fluctuation can be performed with high accuracy while suppressing the influence of noise.

As a result, as shown in FIG. 8C, the acceleration waveforms that should be excluded from earthquake determination can be properly selected according to the levels of the frequency and the period fluctuation, even in the event that vibration from a nearby construction site is detected, for example.

Figures 9A, 9B:
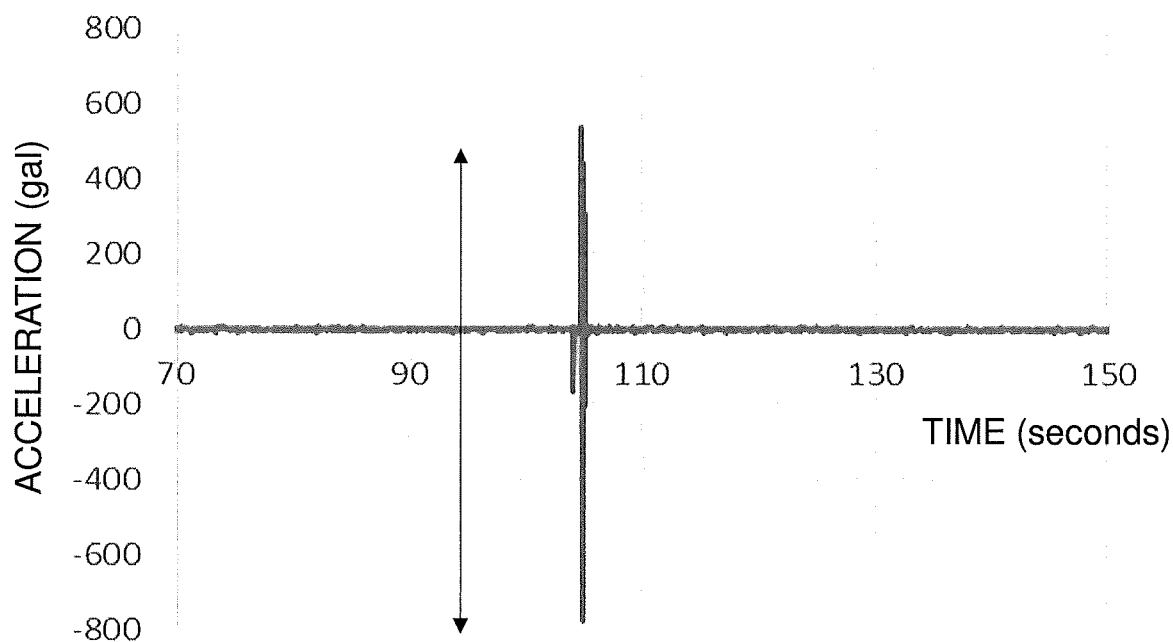
FIG. 9A is a graph of the acceleration waveform of vibration with a large amplitude and a high frequency classified in the earthquake detection method using the seismic sensor of FIG. 1.
FIG. 9B is a table showing the results of classifying whether or not vibration is an earthquake according to the magnitude of amplitude and frequency.

Next, for the acceleration waveform shown in FIG. 9A, the earthquake determination unit 25 uses the frequency of the acceleration waveform sensed by the frequency sensing unit 24 by peak method as discussed above to determine whether or not to exclude that acceleration waveform from earthquake determination.

More specifically, the earthquake determination unit 25 determines that the acceleration waveform shown in FIG. 9A is a vibration waveform caused by an impact such as a collision because the waveform has a large amplitude (such as 700 gal or more) and a high frequency (such as 0 to 0.1 second (at least 10 Hz)), and excludes this waveform from earthquake determination.

As a result, as shown in FIG. 9B, the acceleration waveforms that should be excluded from earthquake determination can be appropriately selected according to the levels of the amplitude and frequency of the acceleration waveform, eliminating any vibration waveforms caused by an instantaneously applied impact with a large amplitude and high frequency, for example.

Figures 10A, 10B:
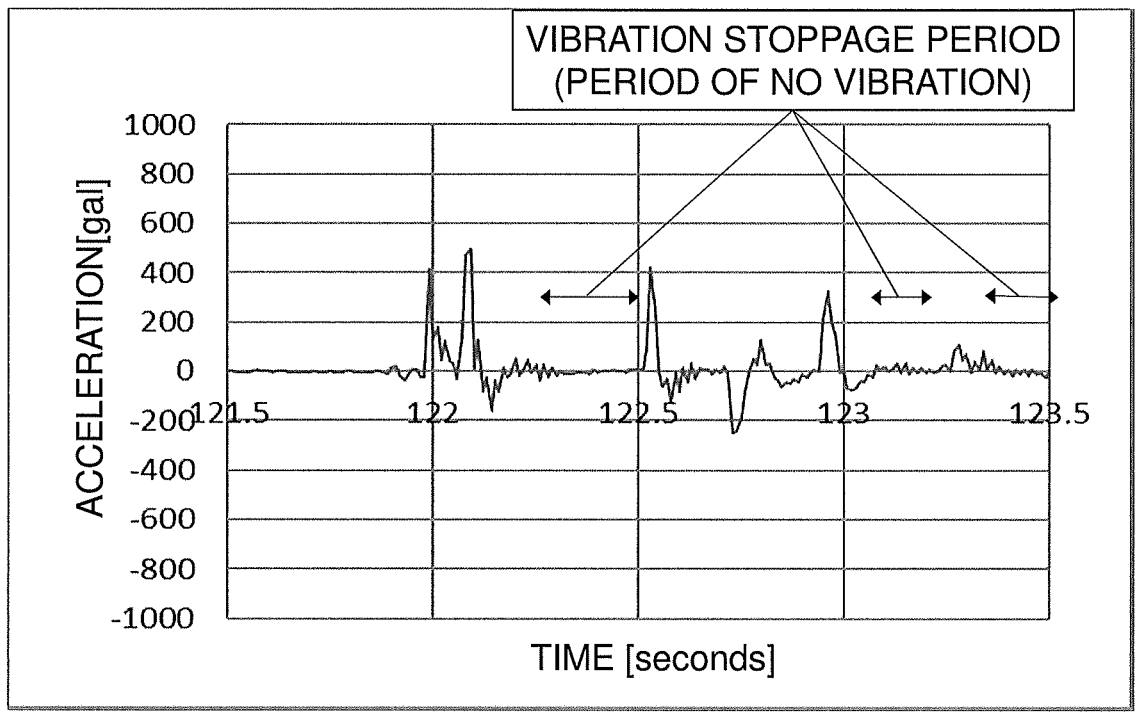
FIG. 10A is a graph of the acceleration waveform of vibration including a region that can be considered to be a stop period.
FIG. 10B is a table showing the results of classifying whether or not there is an earthquake according to the presence or absence of a region that can be considered to be a stoppage period.

Next, the earthquake determination unit 25 determines whether or not to exclude the acceleration waveform shown in FIG. 10A from earthquake determination according to the frequency of the acceleration waveform sensed by the frequency sensing unit 24 by the peak method as described above and whether or not there is a vibration stoppage period.

More specifically, with the acceleration waveform shown in FIG. 10A, since a vibration stoppage period appears in which the amplitude of the vibration converges to almost zero between the vibration waves even if the frequency is relatively low, the earthquake determination unit 25 determines this waveform to be low-frequency vibration due to nearby construction, etc., and excludes it from earthquake determination.

The determination as to whether or not there is a vibration stoppage period is made, for example, by detecting whether or not there is a period in which the maximum value minus the minimum value of the amplitude of the acceleration waveform in a specific period is 50 gal or less 10 times in a row.

As a result, not only high-frequency acceleration waveforms excluded by the above-mentioned determination based on frequency, but also low-frequency acceleration waveforms that include a vibration stoppage period can be excluded from the earthquake determination because they are very likely not to be earthquakes.

With the seismic sensor 10 of this embodiment, the earthquake determination unit 25 then determines that the remaining acceleration waveforms other than those excluded by the above processing are acceleration waveforms representing earthquake vibrations.

The earthquake scale calculation unit 27 then starts calculating a value (SI value) that serves as an index indicating the scale of an earthquake for an acceleration waveform determined by the earthquake determination unit 25 to be an earthquake.

Here, after the earthquake scale calculation unit 27 starts calculating the value that will serve as an index indicating the scale of an earthquake, such as an SI value, if a shock other than an earthquake is applied, there is the risk that the calculation result of the SI value, etc., will be larger than the actual scale of the earthquake.

Figure 11A:
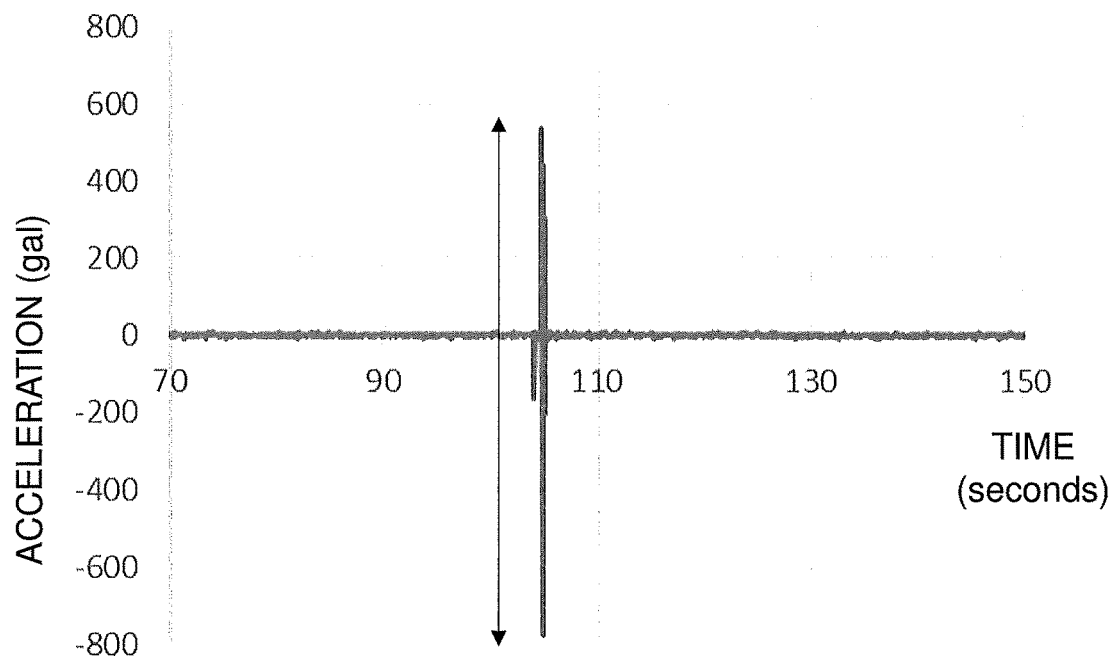
FIG. 11A is a graph of the acceleration waveform of vibration with a high frequency and a large amplitude classified in the earthquake detection method using the seismic sensor of FIG. 1.
Figure 11B:
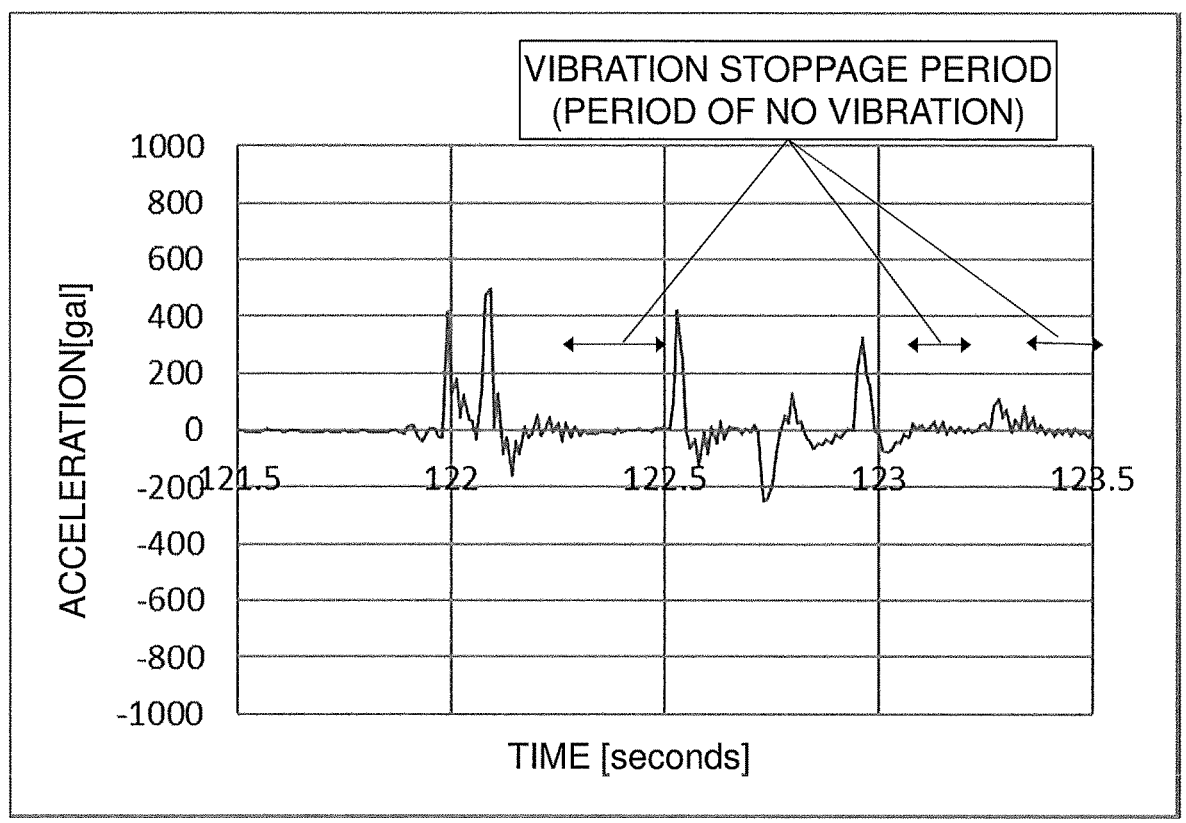
FIG. 11B is a graph including a region that can be considered to be a stoppage period classified in the earthquake detection method using the seismic sensor of FIG. 1.

In view of this, with the seismic sensor 10 of this embodiment, as shown in FIGS. 11A and 11B, for vibrations determined to be vibrations other than earthquakes, their acceleration waveforms are excluded in calculating the scale of the earthquake.

More specifically, since the acceleration waveform shown in FIG. 11A has a high frequency, a large amplitude, and converges in a short period of time, it is assumed to be vibration caused by an impact. Also, although the acceleration waveform shown in FIG. 11B has a low frequency, it includes a vibration stoppage period, and is therefore judged most likely not to be an earthquake.

As a result, for an acceleration waveform determined to be an earthquake, the SI value or the like can be accurately calculated by eliminating the influence of any vibration applied after the start of calculation of the index indicating the scale of the earthquake, such as the SI value.

Earthquake Detection Method

An earthquake detection method using the seismic sensor 10 of this embodiment will now be described with reference to the flowcharts of FIGS. 12 to 15.

Figure 12:
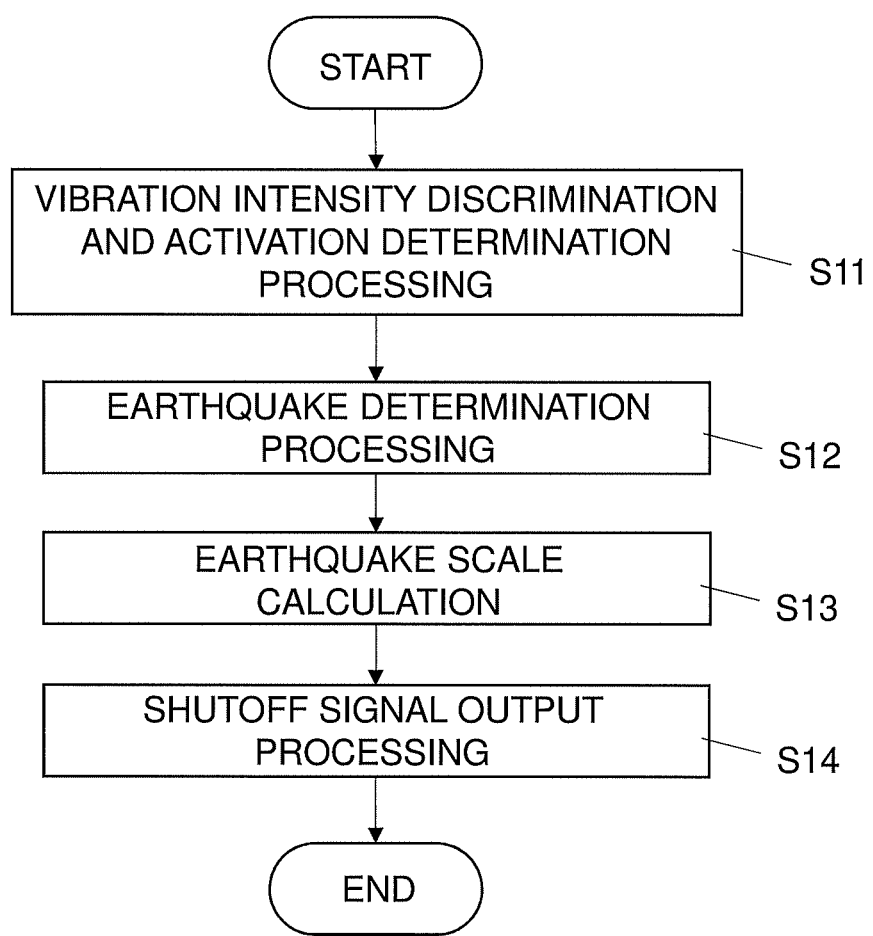
FIG. 12 is a flowchart showing the main flow of processing in an earthquake detection method using the seismic sensor of FIG. 1.

As shown in FIG. 12, first, in step S11, the acceleration acquisition unit 21 of the seismic sensor 10 acquires acceleration data (acceleration measurement step), the acceleration waveform generation unit 22 generates an acceleration waveform on the basis of the acceleration acquired by the acceleration acquisition unit 21 (acceleration waveform generation step), and the vibration intensity discrimination and activation determination unit 23 uses the vibration intensity, etc., sensed from the acceleration waveform generated by the acceleration waveform generation unit 22 to perform vibration intensity discrimination and activation determination processing.

The vibration intensity discrimination and activation determination processing will be described in detail later on using the flowchart shown in FIG. 13.

Next, in step S12, the earthquake determination unit 25 uses the frequency, amplitude, etc., of the acceleration waveform generated by the acceleration waveform generation unit 22 from the acceleration data acquired by the acceleration acquisition unit 21 to determine whether or not the acceleration waveform is vibration produced by an earthquake (frequency sensing step, earthquake determination step).

The earthquake determination processing will be described in detail later on using the flowchart shown in FIG. 14.

Next, in step S13, the earthquake scale calculation unit 27 calculates an index indicating the scale of the earthquake, such as the SI value.

Next, in step S14, the output control unit 28 outputs a signal such as a cutoff signal to the outside according to the scale of the earthquake of the acceleration waveform determined to be an earthquake by the earthquake determination unit 25.

Here, the vibration intensity discrimination and activation determination processing in step S11 will be described in detail through reference to FIG. 13.

In step S21, the system waits until the acceleration sensor 11 senses acceleration due to vibration. Here, when the acceleration sensor 11 senses acceleration due to vibration, the acceleration acquisition unit 21 acquires acceleration data about the detected vibration from the acceleration sensor 11 (acceleration measurement step).

Next, in step S22, the acceleration waveform generation unit 22 uses the acceleration data acquired by the acceleration acquisition unit 21 to generate an acceleration waveform that indicates the relation between the elapsed time and the change in acceleration (acceleration waveform generation step).

Next, in step S23, the vibration intensity discrimination and activation determination unit 23 determines whether or not the vibration intensity is less than a specific vibration intensity (such as being equivalent to a seismic intensity of 4), or whether or not it is a short vibration waveform.

Figure 14:
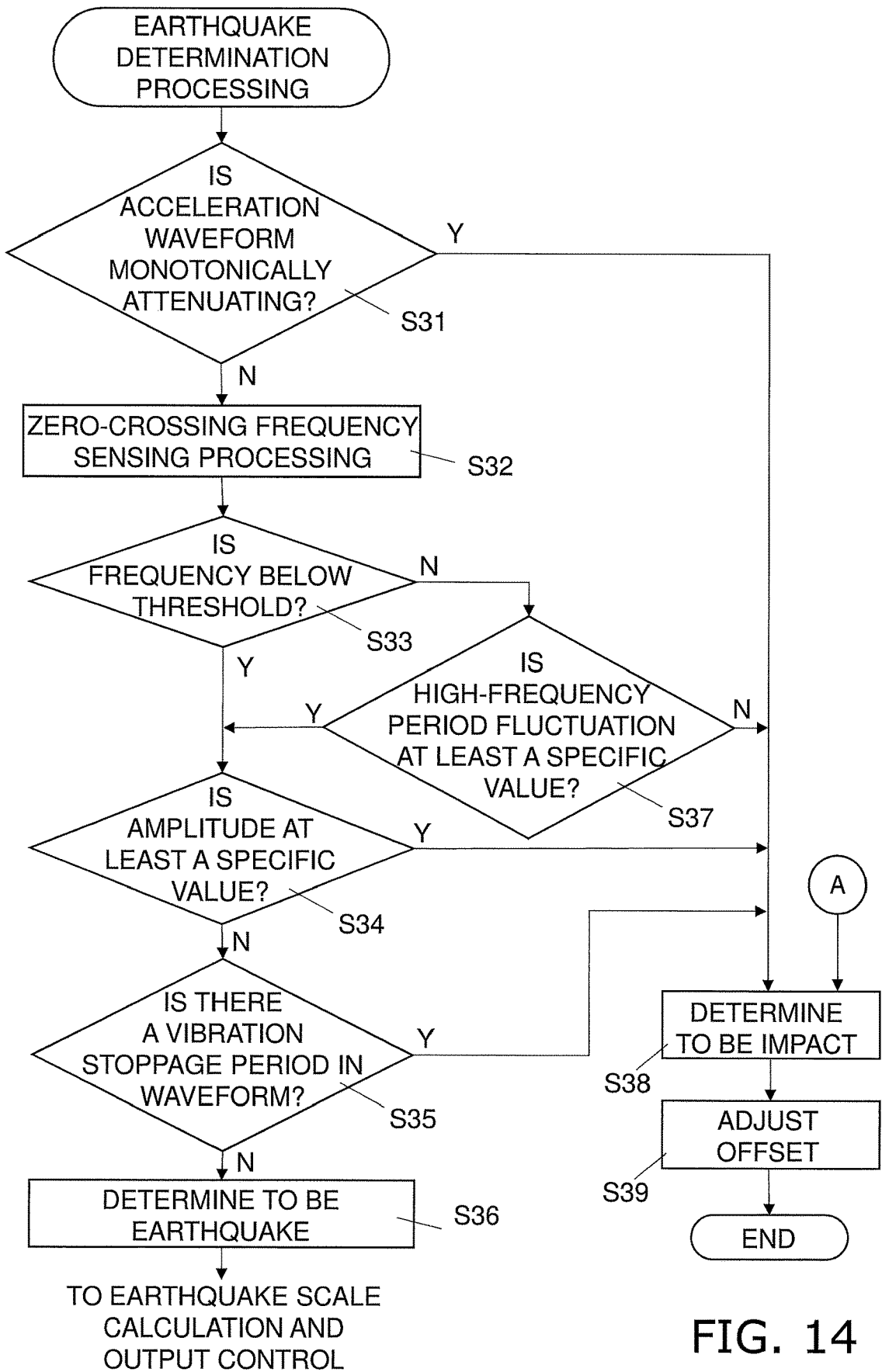
FIG. 14 is a flowchart showing the detailed flow of earthquake determination processing in FIG. 12.

Here, if it is determined that the seismic intensity is less than 4 or that it is a short vibration waveform, the processing moves on to (A) shown in FIG. 14, and the vibration is determined to have been caused by something other than an earthquake, such as an impact. On the other hand, if it is determined that the seismic intensity is equivalent to 4 or more or that the waveform is not a short vibration waveform, there is a possibility that an earthquake has occurred, so the processing proceeds to step S24.

Next, in step S24, since it was determined in step S23 that there is a possibility of an earthquake, processing is performed to activate the seismic sensor 10 (going from sleep mode to active mode), and the flow proceeds to the earthquake determination processing shown in FIG. 14.

Next, the earthquake determination processing of step S12 will be described in detail using FIG. 14.

That is, in step S31 it is determined whether or not the acceleration waveform generated in step S22 is a monotonically attenuating waveform.

More specifically, as mentioned above, the determination of whether or not the waveform is a monotonically attenuating waveform is performed according to whether or not the condition of the maximum value−minimum value of vibration acceleration<100 gal is satisfied, for example.

Here, if it is determined that the waveform corresponds to a monotonically attenuating waveform, the flow proceeds to step S37, and it is determined that the vibration was caused by something other than an earthquake, such as an impact. On the other hand, if it is determined in step S22 that the waveform is not a monotonically attenuating waveform, the flow proceeds to step S32.

Next, in step S32, the frequency sensing unit 24 senses the frequency of the acceleration waveform by the zero-crossing method discussed above (frequency sensing step).

Next, in step S33, it is determined whether or not the frequency sensed in step S32 is below a specific threshold (earthquake determination step). That is, the earthquake determination unit 25 discriminates whether or not the acceleration waveform is to be subjected to earthquake determination, on the basis of the frequency of the acceleration waveform sensed by the frequency sensing unit 24.

Here, the specific frequency threshold is, for example, a frequency of at least 10 Hz (0 to 0.1 second).

Here, if the frequency is determined to be below the threshold, the flow proceeds to step S34, and if determined to be above the threshold, the flow proceeds to step S36.

Next, in step S34, since the frequency of the acceleration waveform was determined in step S33 to be below the threshold value, it is determined that there is a possibility of earthquake vibration, and the earthquake determination unit 25 determines whether or not the amplitude of the acceleration waveform satisfies the condition of being equal to or greater than a specific value.

The specific value set for discrimination by the amplitude of the acceleration waveform refers, for example, to an amplitude of 700 gal or more.

Here, if the amplitude is equal to or greater than the specific value, the flow proceeds to step S38, and if less than the specific value, the flow proceeds to step S35.

Next, in step S35, since it was determined in step S33 that the frequency of the acceleration waveform is below the threshold value, and the amplitude was determined in step S34 to be less than the specific value, it is determined that there is a possibility that the vibration is from an earthquake, and the vibration stoppage period determination unit 26 determines whether or not there is a period in the acceleration waveform during which the vibration comes to a stop (earthquake determination step).

The determination as to whether or not there is a vibration stoppage period is performed, for example, by detecting whether or not there is a period in which the maximum value–the minimum value of the amplitude of the acceleration waveform is 50 gal or less for consecutive times.

Here, if it is determined that there is no vibration stoppage period, the flow proceeds to step S36. On the other hand, if it is determined that there is a vibration stoppage period, the flow proceeds to step S38.

Next, in step S36, since it was determined in step S35 that there is no vibration stoppage period, the earthquake determination unit 25 determines that the vibration of the acceleration waveform does not monotonically attenuate, has a low frequency, has a small amplitude, and there is no vibration stoppage period, and is therefore determined to be an earthquake (earthquake determination step).

On the other hand, in step S37, since it was determined in step S33 that the frequency of the acceleration waveform is above the threshold, the earthquake determination unit 25 determines that the possibility that the vibration is an earthquake is low, and the flow proceeds to step S38 (earthquake determination step).

Figure 13:
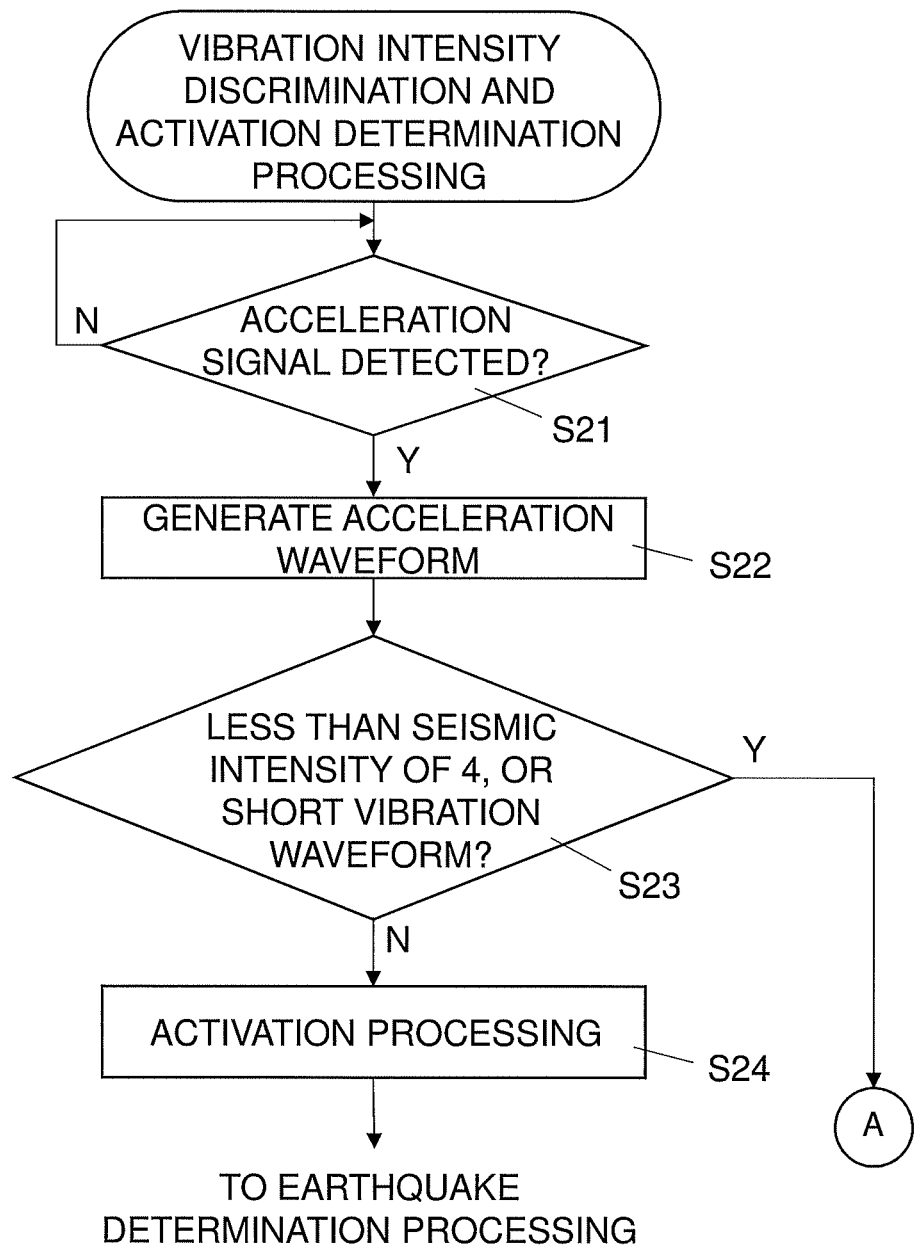
FIG. 13 is a flowchart showing the detailed flow of vibration intensity discrimination and activation determination processing in FIG. 12.

Next, in step S38, since it was determined in steps S34, S35, and S37, and step S23 in FIG. 13, that there is a high possibility that there is no earthquake, the earthquake determination unit 25 determines that the acceleration waveform is vibration due to an impact (earthquake determination step), and the flow proceeds to step S39.

Next, in step S39, the offset adjustment unit 29 adjusts the amount of offset for the acceleration waveform determined to be vibration other than an earthquake due to impact or the like (noise), and the processing is ended.

This offset adjustment is feedback-controlled each time an earthquake determination is performed on an acceleration waveform, and the offset amount is optimized.

Figure 15:
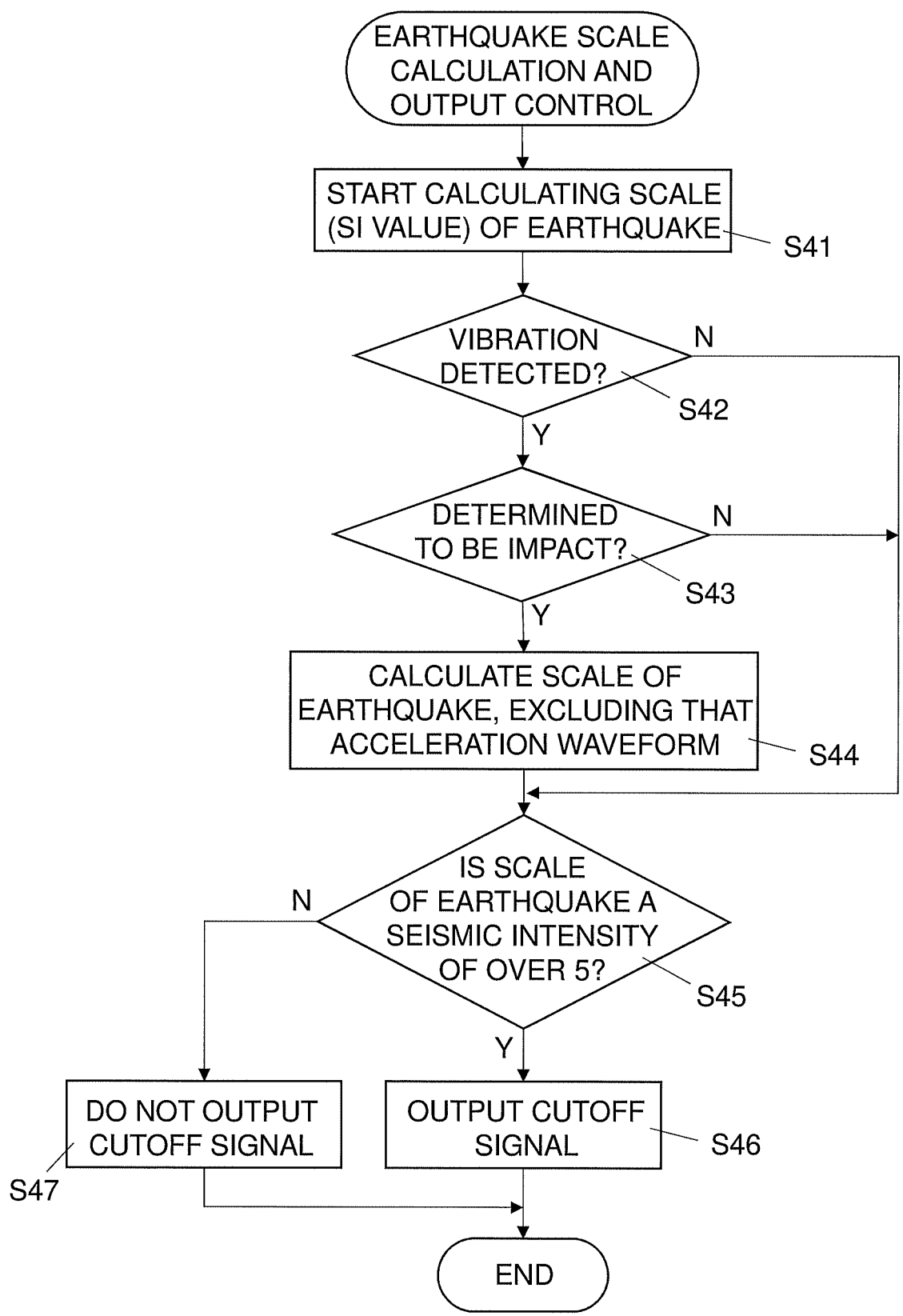
FIG. 15 is a flowchart showing the detailed flow of processing in earthquake scale calculation and output control in FIG. 12.

Here, the earthquake scale calculation and output control processing in step S14 will be described in detail with reference to FIG. 15.

That is, in step S41, the earthquake scale calculation unit 27 calculates the scale of the earthquake (such as the SI value) for the acceleration waveform determined to be an earthquake by the above processing.

Next, in step S42, it is determined whether or not any new vibrations have been detected after the calculation of the scale of the earthquake (SI value, etc.) was started in step S41.

Here, if any new vibration is detected, the flow proceeds to step S43, and otherwise the flow proceeds to step S45 for determination of the scale of the earthquake.

Next, in step S43, since a new vibration was detected in step S42, the earthquake determination unit 25 determines whether or not it is vibration other than an earthquake, due to impact. Here, if it is determined that there has been an impact, the flow proceeds to step S44, and if it is determined that there is a possibility of an earthquake, rather than an impact, the flow proceeds to step S45.

Next, in step S44, since it was determined in step S43 that the detected vibration is a vibration other than an earthquake, such as an impact, the earthquake scale calculation unit 27 excludes the acceleration waveform of the new vibration in calculating the scale of the earthquake.

Next, in step S45, the output control unit 28 determines whether or not the scale of the earthquake calculated in step S44 is at least a specific magnitude (such as a seismic intensity of over 5).

Here, if it is determined that the earthquake has a seismic intensity of over 5, the flow proceeds to step S46, the output control unit 28 controls the output unit 14 so as to output a cutoff signal that will stop the supply of electricity, gas, etc., and the processing is ended.

On the other hand, if it is determined that the earthquake is of a scale smaller than a seismic intensity of over 5, the flow proceeds to step S47, the output control unit 28 controls the output unit 14 so as not to output a cutoff signal, and the process is ended.

Main Features

The seismic sensor 10 of this embodiment comprises the acceleration acquisition unit 21, the acceleration waveform generation unit 22, the frequency sensing unit 24, and the earthquake determination unit 25. The acceleration acquisition unit 21 detects vibration and measures the acceleration of the vibration. The acceleration waveform generation unit 22 generates an acceleration waveform indicating the relation between the elapsed time and the acceleration measured by the acceleration acquisition unit 21. The frequency sensing unit 24 senses the frequency of the acceleration waveform generated by the acceleration waveform generation unit 22 using a zero-crossing method. The earthquake determination unit 25 determines whether or not there is an earthquake on the basis of the frequency sensed by the acceleration acquisition unit 21.

As a result, the frequency of an acceleration waveform can be sensed more accurately than in the past by eliminating the influence of noise generated near the acceleration waveform peak while also eliminating the influence of noise generated near zero acceleration.

Consequently, by using the accurately sensed frequency to determine whether or not the vibration of an acceleration waveform is an earthquake, vibrations that occur when tools are used at a nearby construction site, etc., can be eliminated, for example, allowing the accuracy of earthquake determination to be improved.

As a result, it is possible to give the appropriate output for a seismic motion or the like having a vibration intensity sensed according to the acceleration produced by the vibration.

Other Embodiments

An embodiment of the present invention was described above, but the present invention is not limited to or by the above embodiment, and various modifications are possible without departing from the gist of the invention.

(A)

In the above embodiment, an example was given in which the present invention was realized as a seismic sensor and an earthquake detection method. However, the present invention is not limited to this.

For example, the present invention may be realized as an earthquake detection program that causes a computer to execute an earthquake detection method featuring the seismic sensor described above.

This earthquake detection program is stored in a memory (storage unit) installed in the seismic sensor, and a CPU reads the earthquake detection program stored in the memory and causes the hardware to execute various steps. More specifically, the same effect as above can be obtained by having the CPU read an earthquake detection program and execute the above-mentioned acceleration acquisition (measurement) step, acceleration waveform generation step, frequency sensing step, and earthquake determination step.

Also, the present invention may be realized as a recording medium that stores an earthquake detection program featuring a seismic sensor.

(B)

In the above embodiment, an example was given in which the output control unit 28 controlled the output unit 14 so as to output a cutoff signal for stopping the supply of energy such as electricity and gas when vibration detected as an earthquake has a seismic intensity of over 5. However, the present invention is not limited to this.

For example, the configuration may be such that the output control unit controls the output unit so as to output a warning signal that warns the user of the occurrence of an earthquake.

(C)

In the above embodiment, an example was given in which the determination as to whether or not to exclude from earthquake determination an acceleration waveform generated by sensing the acceleration of vibration, was performed according to whether or not the frequency was 10 Hz or higher. However, the present invention is not limited to this.

For example, the specific value for determining whether or not to exclude an acceleration waveform from earthquake determination is not limited to 10 Hz, and may be a value greater than 10 Hz or a value less than 10 Hz.

(D)

In the above embodiment, an example was given in which the determination of whether or not to exclude an acceleration waveform generated by sensing vibration acceleration was made depending on whether or not the condition that the fluctuation of the period (frequency) be within ±0.01 second three consecutive times is satisfied. However, the present invention is not limited to this.

For example, the condition for determining the period fluctuation is not limited to the one described above, and may be some other condition.

(E)

In the above embodiment, an example was given in which the determination as to whether or not to exclude an acceleration waveform generated by sensing the acceleration of vibration from earthquake determination was made according to whether or not the amplitude of the acceleration waveform is at least 700 gal. However, the present invention is not limited to this.

For example, the determination condition related to the amplitude of the acceleration waveform is not limited to the numerical value range described above, and some other condition may be used.

(F)

In the above embodiment, an example was given in which the presence or absence of a vibration stoppage period was determined according to whether or not the maximum value–minimum value of the amplitude of the acceleration waveform was 50 gal or less 10 consecutive times. However, the present invention is not limited to this.

For example, whether or not there is a vibration stoppage period may be determined based on some condition other than the one above.

(G)

In the above embodiment, an example was given in which, in addition to the magnitude of the frequency of the acceleration waveform, the determination as to whether or not an earthquake had occurred was made according to the monotonic attenuation, period fluctuation, amplitude, the presence or absence of a vibration stoppage period, etc. However, the present invention is not limited to this.

For example, at least one of the above means, or some means other than those above, may be used as a determination means other than the magnitude of the frequency of the acceleration waveform.

The invention claimed is:

1. A seismic sensor, comprising:
   an acceleration measurement unit configured to sense vibration and measures the acceleration of a vibration;
   an acceleration waveform generation unit configured to generate an acceleration waveform indicating a relation between an elapsed time and the acceleration measured by the acceleration measurement unit;
   a frequency sensing unit configured to sense the frequency of the acceleration waveform generated by the acceleration waveform generation unit by a zero-crossing method; and
   an earthquake determination unit configured to determine whether or not an earthquake has occurred on the basis of the frequency sensed by the frequency sensing unit, wherein
   the earthquake determination unit excludes the acceleration waveform from the determining of whether or not the earthquake has occurred when the frequency of the acceleration waveform sensed by a zero-crossing method is at least a specific value and a period fluctuation of the acceleration waveform is no more than a specific value, and
   the earthquake determination unit excludes the acceleration waveform from the determining of whether or not the earthquake has occurred when an amplitude of the acceleration waveform is at least a specific value and the frequency sensed by a peak method is at least a specific value.

2. The seismic sensor according to claim 1,
   further comprising an offset adjustment unit configured to adjust an offset amount of the acceleration waveform according to a magnitude of noise when the earthquake determination unit determines that the vibration detected by the acceleration measurement unit is noise.

3. The seismic sensor according to claim 2, wherein the offset adjustment unit adjusts the offset amount of the acceleration waveform according to a determination result of the earthquake determination unit on the basis of the acceleration waveform.

4. The seismic sensor according to claim 1, further comprising an earthquake scale calculation unit configured to determine whether or not an earthquake has at least a specific seismic intensity when the earthquake determination unit determines that there has been an earthquake.

5. The seismic sensor according to claim 1, further comprising an activation determination unit configured to calculate an intensity of a vibration from a result of measurement by the acceleration measurement unit, and if the intensity of the vibration is at least a specific magnitude, transition from a power saving mode to a measurement mode in which more power is consumed than in the power saving mode.

6. The seismic sensor according to claim 1, wherein the earthquake determination unit excludes the acceleration waveform from earthquake determination when the acceleration waveform has attenuated to a vibration with no more than a specific seismic intensity within a specific length of time.

7. The seismic sensor according to claim 1, further comprising a vibration stoppage period determination unit configured to determine whether or not there is a period in the acceleration waveform in which vibration has stopped.

8. The seismic sensor according to claim 7, wherein the frequency sensing unit senses the frequency of the acceleration waveform by a peak method.

9. The seismic sensor according to claim 4, wherein when an acceleration waveform that can be considered as a shock is detected after a start of calculation of an index indicating a magnitude of the earthquake, the earthquake scale calculation unit calculates a scale of the earthquake while excluding that acceleration waveform.

10. The seismic sensor according to claim 9, wherein the frequency sensing unit senses the frequency of the acceleration waveform by a peak method.

11. The seismic sensor according to claim 9, further comprising an output unit configured to output a specific signal when the earthquake determination unit determines that there is an earthquake.

12. The seismic sensor according to claim 11, further comprising an output control unit configured to control the output of a signal from the output unit according to whether or not the scale of the earthquake calculated by the earthquake scale calculation unit has at least a specific seismic intensity.

13. The seismic sensor according to claim 11, wherein the specific signal includes a cutoff signal configured to stop a supply of energy.

14. The seismic sensor according to claim 11, wherein the specific signal includes a warning signal that warns a user.

15. An earthquake detection method by using a seismic sensor comprising:
    detecting vibration and measuring an acceleration of the vibration by an acceleration measurement unit of the seismic sensor;
    generating an acceleration waveform indicating a relation between an elapsed time and the acceleration measured in the acceleration measurement unit by an acceleration waveform generation unit of the seismic sensor;
    sensing a frequency of the acceleration waveform generated in the acceleration waveform generation unit by a zero-crossing method by a frequency sensing unit of the seismic sensor; and
    determining whether or not there is an earthquake on the basis of the frequency sensed in the frequency sensing unit by an earthquake determination unit of the seismic sensor,
    wherein in the determination, the acceleration waveform is excluded from the determining of whether or not the earthquake has occurred when the frequency of the acceleration waveform sensed by a zero-crossing method is at least a specific value and a period fluctuation of the acceleration waveform is no more than a specific value, and
    wherein in the determination, the acceleration waveform is excluded from the determining of whether or not the earthquake has occurred when an amplitude of the acceleration waveform is at least a specific value and the frequency sensed by a peak method is at least a specific value.

16. An earthquake detection program for causing a computer to execute an earthquake detection method by using a seismic sensor comprising:
    detecting vibration and measuring an acceleration of the vibration by an acceleration measurement unit of the seismic sensor;
    generating an acceleration waveform indicating a relation between an elapsed time and the acceleration measured in the acceleration measurement unit by an acceleration waveform generation unit of the seismic sensor;
    sensing the frequency of the acceleration waveform generated in the acceleration waveform generation unit by a zero-crossing method by a frequency sensing unit of the seismic sensor; and
    determining whether or not there is an earthquake on the basis of the frequency sensed in the frequency sensing unit by an earthquake determination unit of the seismic sensor, wherein
    in the determining, the acceleration waveform is excluded from the determining of whether or not the earthquake has occurred when the frequency of the acceleration waveform sensed by a zero-crossing method is at least a specific value and a period fluctuation of the acceleration waveform is no more than a specific value, and
    in the determining, the acceleration waveform is excluded from the determining of whether or not the earthquake has occurred when an amplitude of the acceleration waveform is at least a specific value and the frequency sensed by a peak method is at least a specific value.

* * * * *